(12) United States Patent
Sonobe et al.

(10) Patent No.: US 8,076,013 B2
(45) Date of Patent: Dec. 13, 2011

(54) MAGNETIC RECORDING MEDIUM, MAGNETIC RECORDING MEDIUM MANUFACTURING METHOD, AND MAGNETIC DISK

(75) Inventors: Yoshiaki Sonobe, Singapore (SG); Takahiro Onoue, Singapore (SG); Koichi Wago, San Jose, CA (US)

(73) Assignee: WD Media (Singapore) Pte. Ltd., Singapore (SG)

( * ) Notice: Subject to any disclaimer, the term of this patent is extended or adjusted under 35 U.S.C. 154(b) by 64 days.

(21) Appl. No.: 12/526,866

(22) PCT Filed: Feb. 13, 2008

(86) PCT No.: PCT/JP2008/052372
§ 371 (c)(1),
(2), (4) Date: Aug. 12, 2009

(87) PCT Pub. No.: WO2008/099859
PCT Pub. Date: Aug. 21, 2008

(65) Prior Publication Data
US 2010/0021768 A1 Jan. 28, 2010

(30) Foreign Application Priority Data

Feb. 13, 2007 (JP) .................................. 2007-031750
Feb. 13, 2007 (JP) .................................. 2007-031751

(51) Int. Cl.
*G11B 5/667* (2006.01)
(52) U.S. Cl. ...................... 428/827; 428/828.1; 428/829; 360/135
(58) Field of Classification Search ........................ None
See application file for complete search history.

(56) References Cited

U.S. PATENT DOCUMENTS

| | | | |
|---|---|---|---|
| 6,331,364 B1 | 12/2001 | Baglin et al. | |
| 6,468,670 B1 | 10/2002 | Ikeda et al. | |
| 6,579,634 B2 * | 6/2003 | Saito | 428/845.5 |
| 6,660,357 B1 * | 12/2003 | Litvinov et al. | 428/827 |
| 7,422,808 B2 * | 9/2008 | Sugimoto et al. | 428/828.1 |
| 7,470,474 B2 * | 12/2008 | Sakawaki et al. | 428/829 |
| 7,531,249 B2 * | 5/2009 | Oikawa | 428/829 |
| 7,927,725 B2 * | 4/2011 | Ishio et al. | 428/836 |
| 2004/0191557 A1* | 9/2004 | Kamata et al. | 428/611 |
| 2005/0122609 A1 | 6/2005 | Albrecht et al. | |

(Continued)

FOREIGN PATENT DOCUMENTS

JP 2001256630 A * 9/2001

(Continued)

OTHER PUBLICATIONS

JOP Abstract Translation of JP 2001-256630 A (PAT-No. JP02001256630A). Patent published 2001.*

(Continued)

*Primary Examiner* — Kevin Bernatz

(57) ABSTRACT

A magnetic recording medium (10) has a substrate (12) and a perpendicular magnetic recording layer (30) formed over the substrate (12). The perpendicular magnetic recording layer (30) has a granular layer (20) in which a magnetic signal is recorded and a continuous film layer (24) magnetically coupled to the granular layer (20). The continuous film layer (24) has hard magnetic portions (204) formed in positions corresponding to the recording regions where magnetic signals are recorded in the granular layer (20) and magnetic shield portions (202) formed between the hard magnetic portions (204), each having a magnetization curve whose slope is larger than those of the hard magnetic portions in the region where the applied magnetic filed is zero when the magnetization curve is measured, and each having a residual magnetic polarization smaller than those in the hard magnetic portions.

15 Claims, 7 Drawing Sheets

U.S. PATENT DOCUMENTS

| | | | |
|---|---|---|---|
| 2006/0040140 A1* | 2/2006 | Kaizu et al. | 428/829 |
| 2006/0199043 A1* | 9/2006 | Sugimoto et al. | 428/828.1 |
| 2008/0292907 A1* | 11/2008 | Berger et al. | 428/828 |
| 2009/0166184 A1* | 7/2009 | Zhou et al. | 204/192.11 |
| 2009/0214895 A1* | 8/2009 | Hinoue et al. | 428/827 |
| 2010/0033872 A1* | 2/2010 | Xi et al. | 360/135 |

FOREIGN PATENT DOCUMENTS

| | | |
|---|---|---|
| JP | 2005-166238 A | 6/2005 |
| JP | 2005-223177 A | 8/2005 |
| JP | 2008-084432 A | 4/2008 |
| SG | 141396 A | 4/2008 |

OTHER PUBLICATIONS

Machine Translation of jP 2001-256630 A (Patent published 2001).*

JP Abstract of JP 2007-273067 A (Pat-No. JP02007273067A, pub. Oct. 18, 2007).*

Shingo Takahashi et al.; Grooved soft-underlayer for double-layered medium; Journal of Magnetism and Magnetic Materials 287 (2005), 260-264.

Search Report and Written Opinion dated Nov. 11, 2010, in Singapore Patent Application No. 200905355-4, 14 pages.

* cited by examiner (a)

(b)

MAGNETIC RECORDING MEDIUM, MAGNETIC RECORDING MEDIUM MANUFACTURING METHOD, AND MAGNETIC DISK

TECHNICAL FIELD

This invention relates to a magnetic recording medium and a magnetic recording medium manufacturing method. Particularly, this invention relates to a perpendicular magnetic recording medium adapted to be mounted in a perpendicular magnetic recording type HDD (hard disk drive) or the like and to a manufacturing method thereof.

BACKGROUND ART

In recent years, the information-oriented society has continued the rapid advance and the information recording capacity exceeding 200 Gbytes has been required per 2.5-inch magnetic disk in magnetic recording apparatuses represented by HDDs (hard disk drives). In order to satisfy such a requirement in the magnetic disk, it is necessary to realize an information recording density (areal recording density) exceeding 200 Gbits per square inch (200 Gbits/inch2). Since high recording resolution can be obtained in the perpendicular magnetic recording system comprising a perpendicular two-layer medium and a single-pole head, it has been studied and developed as the next-generation high-density recording system.

In a magnetic disk, an improvement in areal recording density is achieved by an improvement in track density and an improvement in linear density. As a method of improving the linear density of the two, there has conventionally been proposed a CGC (Coupled Granular and Continuous) medium having a granular layer (Granular layer) and a continuous film layer (Continuous layer) (see, e.g. Patent Document 1). In the CGC medium, three points, i.e. a reduction in magnetization transition region noise of a recording layer, an improvement in thermal stability of recorded signals, and easiness of recording, can be realized in a well-balanced manner and thus it is possible to properly improve the linear density.

In recent years, a DTR (discrete track) medium, a patterned (bit-patterned) medium, and the like have been proposed as a technique of improving the track density. In the DTR medium, the patterned medium, or the like, a nonmagnetic isolation region such as a groove is formed by, for example, a mechanical method between recording regions where magnetic signals are recorded, thereby magnetically isolating the recording regions from each other. This makes it possible to suppress the influence between the adjacent recording regions to thereby improve the track density. Further, conventionally, as a method of manufacturing a DTR medium, there is known a method of locally implementing Ag ions into a thin film having a predetermined composition (see, e.g. Patent Document 2). In this method, a portion where no Ag ions are implemented serves as a portion having a smaller coercive force.

Patent Document 1: U.S. Pat. No. 6,468,670B1 Specification
Patent Document 2: JP-A-2005-223177

First, the first invention will be described.

DISCLOSURE OF THE INVENTION ABOUT THE FIRST INVENTION

Problem to be Solved by the Invention about the First Invention

In a DTR medium, a patterned medium, or the like, an isolation region such as a groove is normally formed over the entire thickness of a magnetic recording layer. However, as the track density increases, the width of the isolation region decreases. Therefore, when the track density becomes high, the ratio of the depth to the width (aspect ratio) becomes so large that there is a possibility that accurate processing of the isolation region becomes difficult. Further, for example, also in the method disclosed in Patent Document 2, it is necessary to implant Ag ions over the entire thickness of a thin film to be a magnetic recording layer. Therefore, there is a possibility that it becomes difficult to accurately carry out setting of a region where no Ag ions are implemented.

Taking this into account, the inventors of this application have found that, for example, with respect to a CGC medium, it is possible to magnetically isolate recording regions from each other by forming an isolation region only in a continuous film layer of a magnetic recording layer comprising a granular layer and the continuous film layer. With this configuration, it is not necessary to form the isolation region in the entire magnetic recording layer of, for example, 15 to 20 nm and thus it is possible to accurately form the isolation region. Further, they have found that not only in the case of the CGC medium, but also in the case where a magnetic recording layer comprises a main recording layer for recording magnetic signals and an auxiliary magnetic layer magnetically coupled to the main recording layer, it is possible to magnetically isolate recording regions from each other by forming an isolation region only in the auxiliary magnetic layer.

As a result of conducting further intensive studies, however, the inventors of this application have found that, for example, when the track density increases and thus the width of an isolation region further decreases, there is a case where magnetic isolation between recording regions becomes insufficient with the structure in which a nonmagnetic isolation region is formed only in an auxiliary magnetic layer. For example, they have found that when recording a magnetic signal in a recording region, there is a possibility that the recording magnetic field extends beyond an isolation region to affect an adjacent recording region.

It is therefore an object of this first invention to provide a magnetic recording medium and a magnetic recording medium manufacturing method, which can solve the above-mentioned problems.

Means for Solving the Problem about the First Invention

Through intensive studies, the inventors of this application have found that it is possible to properly prevent a recording magnetic field from affecting an adjacent recording region by forming, when forming an isolation region in an auxiliary magnetic layer, a region (magnetic shield portion) adapted to restrict passage of a magnetic field by predetermined magnetic properties, not a nonmagnetic region such as a groove. This first invention has the following configurations.

(Configuration 1)

A magnetic recording medium comprising a substrate and a magnetic layer formed over the substrate, wherein the magnetic layer comprises a main recording layer for recording a magnetic signal and an auxiliary magnetic layer magnetically coupled to the main recording layer, and the auxiliary magnetic layer comprises a plurality of hard magnetic portions respectively formed at positions corresponding to recording regions, where magnetic signals are to be recorded, in the main recording layer, and magnetic field shield portions formed between the plurality of hard magnetic portions, respectively, wherein when magnetization curves are measured, the magnetization curve of each magnetic field shield portion has a slope greater than those of the hard magnetic portions in a region where an applied magnetic field is zero, and a residual magnetic polarization of each magnetic field shield portion is smaller than those of the hard magnetic portions.

The recording regions of the main recording layer are defined by, for example, magnetic influence received from the auxiliary magnetic layer. When, for example, a magnetic field is applied from the outside, the magnetic field shield portion generates a demagnetizing field in a direction opposite to the applied magnetic field, thereby making the inner magnetic flux density smaller than the outer magnetic flux density. By reducing the inner magnetic flux density, the magnetic field is prevented from extending between the hard magnetic portions in a direction parallel to a main surface of the substrate, for example.

With this configuration, it is possible to properly carry out magnetic isolation between the recording regions. Therefore, for example, it is possible to make the magnetic recording medium properly function as a DTR medium or a patterned medium. Further, for example, since the track edge noise is reduced by this, it is possible to reduce the track width (Erase width) and thus to improve the track density.

Further, with this configuration, when carrying out magnetic recording in each recording region, it is possible to restrict passage of a magnetic field with respect to the magnetic shield portions. By this, it is possible to block a recording magnetic field extending toward the outside of the recording region, thereby making the boundaries of the recording magnetic field sharp. This makes it possible to properly prevent the influence of the recording magnetic field from being exerted on the adjacent recording regions. Therefore, magnetic isolation between the recording regions can be more appropriately carried out.

Herein, this magnetic recording medium has, for example, at least two magnetic layers having different compositions and exchange-coupled to each other. The main recording layer is, for example, a magnetic layer having a greater thickness or a greater coercive force in the two magnetic layers. The auxiliary magnetic layer is a magnetic layer having a smaller thickness or a smaller coercive force. A magnetic anisotropy constant Ku of the auxiliary magnetic layer is preferably greater than that of the main recording layer.

The recording region of the main recording layer is, for example, a recording region corresponding to a track extending in a direction in which a head relatively scans a magnetic recording medium. In the magnetic recording medium, a plurality of tracks are disposed with a constant gap defined between the adjacent tracks, for example. When the magnetic recording medium is a magnetic disk, a plurality of tracks are disposed in concentric circles surrounding the center of the magnetic disk. The hard magnetic portions of the auxiliary magnetic layer are formed at positions overlapping the tracks, respectively.

On the other hand, the magnetic field shield portions are formed in regions corresponding to non-recording regions of the main recording layer. For example, the magnetic field shield portions are each formed in a guard band region being a gap region between the adjacent tracks. The recording regions of the main recording layer may be regions corresponding to magnetic recording bits on the tracks. In this case, for example, magnetic field shield portions are further formed in regions each located between the bits on the tracks.

The magnetic field shield portions are preferably formed substantially only in the auxiliary magnetic layer out of the main recording layer and the auxiliary magnetic layer. With this configuration, since it becomes unnecessary to form magnetic field shield portions with a large aspect ratio, it is possible to form magnetic field shield portions easily and accurately as compared with, for example, the case of forming magnetic field shield portions over the entire thickness of the magnetic recording layer. Forming the magnetic field shield portions only in the auxiliary magnetic layer also includes, for example, the case where the magnetic field shield portions are also formed in part of the main recording layer in a range not affecting the accuracy of and the number of processes for formation of the magnetic field shield portions.

The auxiliary magnetic layer is preferably a magnetic layer in which the width of the grain boundaries of magnetic grains in the hard magnetic portions is smaller than that of the grain boundaries of magnetic grains in the main recording layer. It is preferable that the magnetic grains in the hard magnetic portions of the auxiliary magnetic layer be exchange-coupled to each other with a coupling force greater than that between the magnetic grains of the main recording layer in the direction parallel to the main surface of the substrate. With this configuration, for example, it is possible to improve the thermal stability of signals recorded in the main recording layer. The grain boundary of magnetic grains is a region where, for example, atomic arrangement at a boundary between magnetic grains is disturbed, and is, for example, a region occupied by impurities precipitated between uniform magnetic grains whose axes of easy magnetization agree with each other. The width of the grain boundaries of the magnetic grains in the hard magnetic portions of the auxiliary magnetic layer being smaller than that of the grain boundaries of the magnetic grains in the main recording layer also includes, for example, the case where the hard magnetic portions of the auxiliary magnetic layer are each a layer with an amorphous structure or the like with substantially no grain boundaries present.

(Configuration 2)

The magnetic field shield portions are soft magnetic. With this configuration, it is possible to properly prevent extension of a magnetic field by the magnetic field shield portions. This makes it possible to more appropriately sharpen the boundaries of a recording magnetic field. The magnetic field shield portion may be a region where the magnetic properties of the entire magnetic layer, at that position, combining the main recording layer and the auxiliary magnetic layer exhibit the soft magnetic properties.

(Configuration 3)

The magnetic field shield portions have an axis of easy magnetization in an in-plane direction parallel to a main surface of the substrate. With this configuration, it is possible to more appropriately block a recording magnetic field extending toward the adjacent recording regions.

(Configuration 4)

The magnetic recording medium is a magnetic recording medium for perpendicular magnetic recording. The hard magnetic portions of the auxiliary magnetic layer are magnetic regions that exhibit perpendicular magnetic anisotropy due to interface magnetic anisotropy. The magnetic field shield portions of the auxiliary magnetic layer are magnetic regions of which an interface state is different from that of the hard magnetic portions and which exhibit substantially no perpendicular magnetic anisotropy due to interface magnetic anisotropy. The perpendicular magnetic anisotropy is, for example, a magnetic anisotropy in which the magnetic moment tends to turn in a direction perpendicular to the main surface of the substrate.

When configured in this manner, for example, the magnetic field shield portions can be formed by changing the interface state of the auxiliary magnetic layer. Therefore, with this configuration, the magnetic field shield portions can be formed easily and properly.

(Configuration 5)

The main recording layer is a layer with a granular structure in which a nonmagnetic substance is segregated at grain boundaries of magnetic grains, and the hard magnetic portions of the auxiliary magnetic layer are each a multilayer film in which layers of a Co compound and Pd layers or Pt layers are alternately laminated.

When configured in this manner, the magnetic recording medium becomes, for example, a CGC medium. With this configuration, magnetic isolation between the recording regions of the main recording layer can be properly carried out by forming the magnetic field shield portions in the auxiliary magnetic layer. Therefore, it becomes possible to make the magnetic recording medium properly function as a DTR medium or a patterned medium and to improve the track density. The above-mentioned nonmagnetic substance is, for example, an oxide. This oxide is preferably a metal oxide.

(Configuration 6)

A method of manufacturing a magnetic recording medium comprising a substrate and a magnetic layer formed over the substrate, the magnetic layer comprising a main recording layer for recording a magnetic signal and an auxiliary magnetic layer magnetically coupled to the main recording layer, the method comprising a main recording layer forming step of forming the main recording layer, and an auxiliary magnetic layer forming step of forming the auxiliary magnetic layer, wherein the auxiliary magnetic layer forming step is a step of forming a plurality of hard magnetic portions respectively at positions corresponding to recording regions, where magnetic signals are to be recorded, in the main recording layer and magnetic field shield portions respectively between the plurality of hard magnetic portions such that when magnetization curves are measured, the magnetization curve of each magnetic field shield portion has a slope greater than those of the hard magnetic portions in a region where an applied magnetic field is zero, and a residual magnetic polarization of each magnetic field shield portion is smaller than those of the hard magnetic portions. The recording regions of the main recording layer are defined by, for example, magnetic influence received from the auxiliary magnetic layer. With this configuration, it is possible to obtain an effect similar to that of Configuration 1.

(Configuration 7)

The auxiliary magnetic layer forming step forms a hard magnetic layer and irradiates an ion beam on part of the hard magnetic layer to soft-magnetize regions irradiated with the ion beam, thereby forming the magnetic field shield portions.

When configured in this manner, the magnetic field shield portions can be properly formed by a simple process. The auxiliary magnetic layer is preferably a multilayer film. With this configuration, the magnetic field shield portions can be easily formed by, for example, changing the interface state of the multilayer film by irradiation of an ion beam.

Herein, conventionally, as a method of forming guard bands from a soft magnetic material, there is also known a method of patterning a soft magnetic layer (SUL layer) located under a magnetic recording layer (S. Takahashi, K. Yamakawa, K. Ouchi, and S. Iwasaki, J. MMM. 287(2005) 260). However, according to this method, there is a possibility that the process is complicated to cause an increase in cost. Further, since patterning of the soft magnetic layer is required, there is a possibility that it becomes difficult to implement processing with sufficient accuracy for high recording density. In contrast, according to Structure 7, the magnetic shield portions can be formed by the extremely simplified process. Further, irradiation of an ion beam can be performed with significantly high position accuracy as compared with, for example, the case of patterning the soft magnetic layer. This is because since the soft magnetic layer is normally as thick as 10 to 100 nm, it cannot be processed with high accuracy. In contrast, according to Configuration 7, the magnetic field shield portions can be formed with sufficient accuracy even for high recording density.

In the above-mentioned Configurations 1 to 7, the difference in magnetic properties between the hard magnetic portion and the magnetic field shield portion in the auxiliary magnetic layer may be, for example, the difference in magnetic properties of the entire magnetic layer, at that position, combining the main recording layer and the auxiliary magnetic layer. The magnetic recording medium is not limited to the CGC medium and may alternatively be, for example, an exchange spring (Exchange Spring) medium, an exchange coupled composite (ECC: Exchange Coupled Composite) medium, or the like having a soft magnetic layer as an auxiliary magnetic layer.

Another aspect of this first invention is a mode wherein, in the above-mentioned Configurations 1 to 7, the main recording layer is a layer with a granular structure in which a nonmagnetic substance is segregated at the grain boundaries of magnetic grains, and the auxiliary magnetic layer is a magnetically coupling layer magnetically coupled to the main recording layer.

In this mode, (1) a granular magnetic recording layer is provided, (2) a magnetically coupling layer (not continuous layers but a single layer) is provided, (3) the magnetically coupling layer is magnetically coupled to the magnetic recording layer, and (4) the magnetically coupling layer has hard magnetic portions and soft magnetic portions with magnetism weaker than that of the hard magnetic portions. Further, the magnetic recording layer and the magnetically coupling layer are in contact with each other.

In such another aspect of this first invention, the contents in which "an auxiliary magnetic layer" is replaced by "a magnetically coupling layer" in the above-mentioned Configurations 1 to 7 and the description thereof are applied.

Such another aspect of this first invention includes the following structure.

(Configuration 8)

A magnetic disk in which a magnetic recording layer with a granular structure in which nonmagnetic grain boundary portions are formed between magnetic grains continuously grown in a columnar shape and a magnetically coupling layer adjacent to the magnetic recording layer and magnetically continuous in an in-plane direction of a nonmagnetic substrate are stacked in this order over the substrate, the magnetic disk wherein:

at least the magnetically coupling layer out of the magnetically coupling layer and the magnetic recording layer comprises;

a plurality of hard magnetic portions respectively formed at positions corresponding to recording regions, where magnetic signals are to be recorded, in the magnetic recording layer, and magnetic field shield portions formed between the adjacent hard magnetic portions, respectively, wherein when magnetization curves are measured, the magnetization curve of each magnetic field shield portion has a slope greater than those of the hard magnetic portions in a region where an applied magnetic field is zero, and a residual magnetic polarization of each magnetic field shield portion is smaller than those of said hard magnetic portions.

With this configuration, it is possible to obtain an effect similar to that of the above-mentioned Configuration 1 or the like.

For example, with this configuration, it is possible to properly carry out magnetic isolation between the recording regions. Therefore, for example, it is possible to make the magnetic recording medium properly function as a DTR medium or a patterned medium. Further, for example, since the track edge noise is reduced by this, it is possible to reduce the track width (Erase width) and thus to improve the track density.

In such another aspect of this first invention, the magnetically coupling layer is a thin film, that exhibits perpendicular magnetic anisotropy, on the magnetic recording layer with the granular structure. By exchange interaction between the magnetic recording layer and the magnetically coupling layer magnetically coupled to magnetic grains in the magnetic recording layer, the perpendicular magnetic recording layer and the magnetically coupling layer are magnetically coupled to each other.

Such another aspect of this first invention further includes the following configurations.

(Configuration 9)

The magnetic disk, wherein the hard magnetic portions in the magnetically coupling layer are formed at the positions corresponding to the recording regions, where the magnetic signals are to be recorded, of the magnetic recording layer and the soft magnetic portions are formed in regions other than the positions.

(Configuration 10)

The magnetic disk, wherein the soft magnetic portions and the hard magnetic portions are formed in concentric circles with respect to a center of the disk-shaped substrate.

(Configuration 11)

The magnetic disk, wherein the magnetic recording layer and the magnetically coupling layer are in contact with each other.

(Configuration 12)

The magnetic disk, wherein the magnetically coupling layer contains at least CoCrPt.

EFFECT OF THE INVENTION ABOUT THE FIRST INVENTION

According to this first invention, for example, it is possible to reduce track edge noise to improve the track density. Further, for example, when performing magnetic recording, it is possible to block a recording magnetic field extending toward the outside of a recording region, thereby making the boundaries of the recording magnetic field sharp.

BEST MODE FOR CARRYING OUT THE FIRST INVENTION

Embodiment 1

Hereinbelow, an embodiment according to this first invention will be described with reference to the drawings. FIG. 1 shows one example of a magnetic recording medium 10 according to the embodiment of this invention. FIG. 1(a) shows one example of the structure of the magnetic recording medium 10. The magnetic recording medium 10 is a perpendicular two-layer medium type magnetic disk adapted to be mounted in a perpendicular magnetic recording type HDD (hard disk drive).

In this example, the magnetic recording medium 10 comprises a substrate 12, an adhesive layer 14, a soft magnetic layer 16, an underlayer 18, a perpendicular magnetic recording layer 30, a protective layer 26, and a lubricating layer 28 in this order. The perpendicular magnetic recording layer 30 comprises a granular layer 20, a coupling control layer 22, and a continuous film layer 24.

The substrate 12 is, for example, a glass for a base. As this base glass, there can be cited, for example, an aluminosilicate glass, an aluminoborosilicate glass, a soda-lime glass, or the like. Among them, the aluminosilicate glass is preferable. An amorphous glass or a crystallized glass can be used. For example, when the soft magnetic layer 16 has an amorphous structure, it is preferable that the base glass be the amorphous glass. Use of a chemically strengthened glass is preferable because the rigidity is high.

The surface roughness of a main surface of the substrate 12 is preferably 3 nm or less in Rmax and 0.3 nm or less in Ra. Rmax and Ra follow Japanese Industrial Standard (JIS). By providing such a smooth surface, for example, a gap between the perpendicular magnetic recording layer 30 and the soft magnetic layer 16 can be set constant so that it is possible to form a suitable magnetic circuit across a head (magnetic head), the perpendicular magnetic recording layer 30, and the soft magnetic layer 16. The substrate 12 may be a substrate having an isotropic surface with no texture.

For example, when magnetic field annealing is necessary for controlling magnetic domains of the soft magnetic layer 16, it is particularly preferable to use the substrate 12 being a glass base. Since the glass base is excellent in heat resistance, the heating temperature of the substrate 12 can be set high.

The adhesive layer 14 is a layer (adhesion layer) for improving the adhesion between the substrate 12 and the soft magnetic layer 16. By providing the adhesive layer 14, it is possible to prevent stripping of the soft magnetic layer 16. As a material of the adhesive layer 14, use can be made of, for example, a Ti-containing material. In terms of practical use, the thickness of the adhesive layer 14 is preferably set to 1 to 50 nm. In this example, the adhesive layer 14 is an amorphous CrTi layer. The thickness of the adhesive layer 14 is, for example, about 10 nm.

The soft magnetic layer 16 is a layer for forming a magnetic circuit between the head and the perpendicular magnetic recording layer 30. The soft magnetic layer 16 is not particularly limited as long as it is made of a magnetic substance that exhibits soft magnetic properties and, for example, preferably has as its magnetic property a coercive force Hc of 0.01 to 80 oersteds and more preferably 0.01 to 50 oersteds. Further, it preferably has as its magnetic property a saturation magnetic flux density Bs of 500 emu/cc to 1920 emu/cc.

As a material of the soft magnetic layer 16, there can be cited, for example, an Fe-based material, a Co-based material, or the like. For example, use can be made of an Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, an FeCo-based alloy soft magnetic material, or the like.

The thickness of the soft magnetic layer 16 is, for example, 10 to 200 nm and preferably 20 to 100 nm. When the thickness is less than 10 nm, there is a case where it becomes difficult to form a suitable magnetic circuit across the head, the perpendicular magnetic recording layer 30, and the soft magnetic layer 16, while, when the thickness exceeds 200 nm, there is a case where the surface roughness increases. Further, when the thickness exceeds 200 nm, there is a case where the magnetic domain control becomes difficult.

Herein, large magnetic domains tend to be formed in the soft magnetic layer 16. When large magnetic domains move, there is a possibility of noise generation. Therefore, the soft magnetic layer 16 preferably has a plurality of soft magnetic material layers antiferromagnetically coupled (AFC: Anti-Ferro Magnetically Coupled) to each other. With this configuration, it is possible to prevent noise generation by making the magnetic domains difficult to move.

In this example, the soft magnetic layer 16 comprises a plurality of CoTaZr layers antiferromagnetically coupled to each other through a Ru layer interposed therebetween. The Ru layer is, for example, a layer with an hcp crystal structure. The thickness of the Ru layer is, for example, about 0.9 nm. Each CoTaZr layer is a layer with an amorphous structure. The thickness of each CoTaZr layer is, for example, 20 to 27.5 nm.

The underlayer 18 is a layer for controlling the crystal structure of the perpendicular magnetic recording layer 30. The underlayer 18 may be a multilayer film of a plurality of kinds of films. In this example, the underlayer 18 comprises a first orientation control layer, a second orientation control layer, an isolation promoting layer, and a miniaturization promoting layer in this order over the soft magnetic layer 16.

The first orientation control layer is a layer for controlling the crystal orientation of the second orientation control layer being its upper layer. In this example, the first orientation control layer is, for example, a Ta layer or a CoCrTa layer with a bcc crystal structure close to amorphous. The thickness of the first orientation control layer is, for example, about 3 nm. The second orientation control layer is a layer for improving the orientation of the further upper layer. In this example, the second orientation control layer is a Ru layer with an hcp crystal structure. The thickness of the second orientation control layer is, for example, about 10 nm.

The isolation promoting layer is a layer for separating the composition of its upper layer to promote isolation of crystal grains. The isolation promoting layer is formed by a sputtering method in a state where, for example, the gas pressure is higher than that in forming the Ru layer being the second orientation control layer. By this, the isolation promoting layer becomes a layer in which crystals are small and crystal grains are away from each other. In this example, the isolation promoting layer is a Ru layer with an hcp crystal structure. The thickness of the isolation promoting layer is, for example, about 10 nm.

The miniaturization promoting layer is a layer for promoting miniaturization of crystal grains of its upper layer. In this example, the miniaturization promoting layer is a layer (CoCr—$SiO_2$ layer) with a nonmagnetic crystal grain granular structure in which $SiO_2$ is segregated at the grain boundaries of nonmagnetic CoCr crystal grains. In the miniaturization promoting layer, the CoCr crystal structure is, for example, an hcp crystal structure. The miniaturization promoting layer may partly contain CoCr with a bcc crystal structure. The content of $SiO_2$ in the miniaturization promoting layer is, for example, about 12 at % (e.g. 10 to 16 at %). The thickness of the miniaturization promoting layer is, for example, about 2 nm. The granular layer 20 of the perpendicular magnetic recording layer 30 is formed on the miniaturization promoting layer.

The granular layer 20 is a layer with a granular structure in which an oxide is segregated at the grain boundaries of miniaturized crystal grains, and is one example of a main recording layer. In this example, the granular layer 20 is a CoCrPt—$SiO_2$ layer and contains magnetic grains and a nonmagnetic substance magnetically isolating the magnetic grains at the grain boundaries of the magnetic grains. The thickness of the granular layer 20 is, for example, 20 nm or less, preferably 8 to 16 nm, and more preferably 7 to 15 nm (e.g. about 9 nm).

The magnetic grains of the granular layer 20 are crystal grains that exhibit perpendicular magnetic anisotropy, and are adapted to reverse their magnetic moments according to a signal recorded in the granular layer 20. In this example, these magnetic grains are CoCrPt with an hcp crystal structure. The size (diameter) of the magnetic grains is, for example, 5 to 20 nm and preferably 8 to 15 nm. The width of the grain boundaries of the magnetic grains is 2 nm or more, for example, 2 to 20 nm and preferably 4 to 15 nm. The width of the grain boundaries of the magnetic grains represents, for example, an average value of the widths of the grain boundaries of the magnetic grains in the granular layer 20.

The nonmagnetic substance contained in the granular layer 20 is a nonmagnetic oxide segregated at the grain boundaries of the magnetic grains. In this example, this nonmagnetic substance is, for example, silicon oxide ($SiO_2$). As the nonmagnetic substance, use may be made of, for example, titanium oxide ($TiO_2$) instead of $SiO_2$. The content of $SiO_2$ or the like in the granular layer 20 is, for example, 10 to 16 at % and preferably 12 to 14%.

When, for example, the content of $SiO_2$ or the like is set to 6 at % or more, the SN ratio can be improved by miniaturization of the nonmagnetic substance, but there is also a possibility of the occurrence of degradation in coercive force Hc, perpendicular magnetic anisotropy, or the like of the granular layer 20 alone. Further, by this, the thermal stability of the granular layer 20 alone is considered to be reduced. However, in this example, the continuous film layer 24 is formed over the granular layer 20. Therefore, even if the content of $SiO_2$ or the like in the granular layer 20 is increased, it is possible to prevent the occurrence of these problems.

The coupling control layer 22 is a layer for controlling the strength of magnetic coupling between the granular layer 20 and the continuous film layer 24. In this example, the coupling control layer 22 is, for example, a Pd layer with an fcc crystal structure. The thickness of the coupling control layer 22 is, for example, 2 nm or less and is, for example, 0.5 to 1.5 nm and preferably 0.7 to 1.0 nm (e.g. about 0.8 nm). The coupling control layer 22 may alternatively be a Pt layer.

The continuous film layer 24 is a layer in which exchange coupling continuously extends in a direction parallel to the main surface of the substrate 12. The continuous film layer 24 is one example of an auxiliary magnetic layer and contains magnetic grains that exhibit perpendicular magnetic anisotropy. These magnetic grains are magnetically exchange-coupled to the magnetic grains of the granular layer 20 in a direction perpendicular to the main surface of the substrate 12.

The width of the grain boundaries of these magnetic grains is smaller than that of the grain boundaries of the magnetic grains of the granular layer 20 and, for example, 1 nm or less and is, for example, 0.1 to 1 nm and preferably 0.3 to 0.8 nm. By this, in the direction parallel to the main surface of the substrate 12, the magnetic grains of the continuous film layer 24 are exchange-coupled to each other with a coupling force greater than that between the magnetic grains of the granular layer 20. Therefore, with this configuration, for example, by pinning (Pinning) magnetization of the continuous film layer 24 using magnetization of the granular layer 20, it is possible to improve the thermal stability of recorded signals. The thickness of the continuous film layer 24 is, for example, 1 to 8 nm, preferably 3 to 6 nm, and more preferably 4 to 5 nm.

The ratio A/B between the thickness A of the granular layer 20 and the thickness B of the continuous film layer 24 is, for example, 2 to 5 and preferably 3 to 4. With this configuration, it is possible to exhibit suitable perpendicular magnetic recording characteristics by the exchange coupling. A magnetic anisotropy constant (maximum anisotropy energy) Ku of the magnetic grains of the continuous film layer 24 is, for example, preferably greater than that of the soft magnetic substance. With this configuration, it is possible to reduce the width of domain walls formed in the continuous film layer 24. The magnetic anisotropy constant Ku of the continuous film layer 24 may be greater than that of the granular layer 20. A coercive force Hc of a material forming the continuous film layer 24 may be, for example, smaller than that of the material forming the magnetic grains of the granular layer 20.

In this example, the continuous film layer 24 is in the form of a multilayer film in which CoCr layers 106 and Pd layers 108 are alternately laminated by about three layers (e.g. two or three layers) for each. The CoCr layer 106 is a layer containing magnetic grains of CoCr. The thickness of the CoCr layer 106 is, for example, about 0.35 nm. When the CoCr layer 106 is extremely thin as described above, the magnetic grains of CoCr are not required to have a crystal structure. The CoCr layer 106 may contain, for example, crystal grains of CoCr with an hpc crystal structure. The Pd layer 108 is a nonmagnetic Pd layer with an fcc crystal structure. The thickness of the Pd layer 108 is, for example, about 0.8 nm. When configured in this manner, interface magnetic anisotropy is generated at the interface between the CoCr layer 106 and the Pd layer 108. By stacking the layers 106 and 108, for example, by three layers for each, it is possible to obtain necessary perpendicular magnetic anisotropy. This makes it possible to reduce the thickness of the continuous film layer 24 as compared with using, for example, a single-layer continuous film layer 24.

The continuous film layer 24 may have, for example, a Pt layer instead of the Pd layer 108. Further, the continuous film layer 24 may have a CoB layer instead of the CoCr layer 106. The continuous film layer 24 may alternatively be a multilayer film [CoX/Pd or Pt]n in which layers of a Co compound and Pd layers or Pt layers are alternately laminated by n layers for each. Alternatively, the continuous film layer 24 may be, for example, a single-layer film with high Pt content. The continuous film layer 24 may alternatively be a single-layer film of, for example, CoCrPt, CoPt, CoPd, FePt, $CoPt_3$, $CoPd_3$, amorphous TbFeCoCr, $SmCo_5$, $Nd_2Fe_{14}B$, $Co_{20}Pt_{80}$, or the like.

In this example, magnetic field shield portions 202 are formed in part of the continuous film layer 24. The magnetic field shield portions 202 are formed by, for example, changing the crystal structure thereof by ion-beam irradiation. In the continuous film layer 24, regions where the magnetic field shield portions 202 are not formed serve as hard magnetic portions 204. Details of the magnetic field shield portions 202 and the hard magnetic portions 204 will be described later.

The protective layer 26 and the lubricating layer 28 are further formed over the continuous film layer 24. The protective layer 26 is a layer for protecting the perpendicular magnetic recording layer 30 from an impact of the head. The protective layer 26 is, for example, a carbon-based film with a diamond-like structure. The lubricating layer 28 is a layer for increasing the lubricity between the head and the magnetic recording medium 10. The lubricating layer 28 is, for example, a film of PFPE (perfluoropolyether) formed by a dip coating method.

In the manufacturing processes of the magnetic recording medium 10, the respective layers from the adhesive layer 14 to the continuous film layer 24 are each preferably formed by a sputtering method. Particularly, a DC magnetron sputtering method is preferable because uniform film formation is enabled. On the other hand, the protective layer 26 is preferably formed by a CVD method.

When forming the CoCr layers 106 and the Pd layers 108 of the continuous film layer 24, it is preferable to use Kr as a sputtering gas. With this configuration, the interface magnetic anisotropy can be more appropriately generated by forming the clean interfaces between the CoCr layers 106 and the Pd layers 108. The CoCr layers 106 and the Pd layers 108 may be formed by a CVD method.

Herein, the method of forming the magnetic field shield portions 202 and the hard magnetic portions 204 of the continuous film layer 24 will be described in further detail. The perpendicular magnetic recording layer 30 in the magnetic recording medium 10 of this example is formed through a granular layer forming process, a coupling control layer forming process, and a continuous film layer forming process. The granular layer forming process is one example of a main recording layer forming process and forms the granular layer 20 on the underlayer 18. The coupling control layer forming process forms the coupling control layer 22 on the granular layer 20. The continuous film layer forming process is one example of an auxiliary magnetic layer forming process and forms the continuous film layer 24 on the coupling control layer 22.

In this example, the continuous film layer forming process comprises a hard magnetic layer forming process and an ion-beam irradiation process. The hard magnetic layer forming process forms a hard magnetic layer in the form of the multilayer film of the CoCr layers 106 and the Pd layers 108. The ion-beam irradiation process forms the magnetic field shield portions 202 by irradiating an ion beam on part of the hard magnetic layer to soft-magnetize its regions irradiated with the ion beam. Regions not irradiated with the ion beam are left remaining as the hard magnetic portions 204. By this, the continuous film layer forming process forms the magnetic field shield portions 202 and the hard magnetic portions 204 in the continuous film layer 24.

FIG. 1 (b) shows a first example of an ion-beam irradiation method. In this example, the ion-beam irradiation process uses a silicon stencil mask 40 to set regions, to be irradiated with an ion beam 42, on the continuous film layer 24. Then, the magnetic field shield portions 202 are formed by irradiating the ion beam 42 on those regions. With this configuration, it is possible to accurately set the regions to be irradiated with the ion beam 42. Therefore, according to this example, the magnetic field shield portions 202 can be properly formed with high accuracy.

Herein, the ion-beam irradiation process forms the magnetic field shield portions 202, being soft magnetic regions, in the regions irradiated with the ion beam 42 by, for example, changing the crystal structure of the continuous film layer 24 by the energy of the ion beam 42. In this case, the ion-beam irradiation process may form the magnetic field shield portions 202 so that the entire perpendicular magnetic recording layer 30 combining the granular layer 20, the coupling control layer 22, and the continuous film layer 24 exhibits the soft magnetic properties. The ion-beam irradiation process preferably forms the magnetic field shield portions 202 having an axis of easy magnetization in an in-plane direction parallel to the main surface of the substrate 12. With this configuration, it is possible to more appropriately block a recording magnetic field extending in the direction parallel to the main surface of the substrate 12 by the magnetic field shield portions 202.

In this example, the continuous film layer 24 is the multilayer film of the CoCr layers 106 and the Pd layers 108. This multilayer film exhibits the perpendicular magnetic anisotropy due to the interface magnetic anisotropy. Therefore, the hard magnetic portions 204 not irradiated with the ion beam are magnetic regions that exhibit the perpendicular magnetic anisotropy due to the interface magnetic anisotropy.

The ion-beam irradiation process forms the magnetic field shield portions 202 by irradiating the ion beam 42 on this multilayer film to form an alloy of metals contained in the CoB layers 106 and the Pd layers 108 of the multilayer film, respectively. This makes the interface state of the magnetic field shield portions 202 different from that of the hard magnetic portions 204 so that the magnetic field shield portions 202 become soft magnetic regions that exhibit substantially no perpendicular magnetic anisotropy due to interface magnetic anisotropy. Therefore, according to this example, the magnetic field shield portions 202 can be properly formed by ion-beam irradiation. Further, it is possible to form the magnetic field shield portions 202 substantially only in the continuous film layer 24 among the respective layers included in the perpendicular magnetic recording layer 30.

FIG. 2 is a top view of the continuous film layer 24 showing positions of the magnetic field shield portions 202 and the hard magnetic portions 204. In the figure, white portions and black portions in the hard magnetic portions 204 represent the difference in magnetization direction due to the difference in information recorded in respective bits on tracks. In this example, the magnetic field shield portions 202 are each formed in a guard band region being a gap region between the adjacent tracks. Regions corresponding to the tracks become the hard magnetic portions 204. By this, in the granular layer 20, the tracks are defined by magnetic influence received from the continuous film layer 24.

With this configuration, the tracks are magnetically isolated from each other by the magnetic field shield portions 202. Therefore, it is possible to make the magnetic recording medium 10 (see FIG. 1) properly function as a DTR medium. Further, for example, since the track edge noise is reduced by this, it is possible to reduce the track width (Erase width) and thus to improve the track density.

Further, when configured in this manner, the magnetic field shield portions 202 being the soft magnetic regions prevent a magnetic field from extending in the direction parallel to the main surface of the substrate 12 (see FIG. 1) between the tracks. Therefore, with this configuration, when recording a magnetic signal on the track, it is possible to block a recording magnetic field extending toward the outside of the track, thereby making the boundaries of the recording magnetic field sharp. This makes it possible to properly prevent the influence of the recording magnetic field from being exerted on the adjacent tracks. Therefore, according to this example, magnetic isolation between the tracks can be more appropriately carried out.

The track width L1 of the magnetic recording medium 10 is, for example, 100 to 200 nm and preferably 135 to 165 nm. The track interval (track pitch) L2 being a distance from the center of the track to the center of the adjacent track is, for example, 150 to 250 nm and preferably 180 to 220 nm. The width L3 of each magnetic field shield portion 202 in a track width direction is, for example, 30 to 70 nm and preferably 40 to 60 nm.

Magnetic field shield portions 202 may further be formed in regions each located between bits to be recorded on the tracks. With this configuration, it is possible to make the magnetic recording medium 10 function as a patterned (bit-patterned) medium.

FIGS. 3 and 4 are graphs showing the states of changes in magnetic properties by ion-beam irradiation on multilayer films each being the same as the continuous film layer 24. Table 1 shows ion-beam irradiation conditions corresponding to respective magnetic properties shown in the graphs of FIGS. 3 and 4 and coercive forces Hc and squareness ratios S in the respective magnetic properties.

TABLE 1

| sample | species | dose(/cm$^2$) | energy(keV) | Hc | S |
|---|---|---|---|---|---|
| D1 | Ar$^+$ | 5.0E+15 | 30 | 38 | 0.07 |
| D3 | Ar$^+$ | 1.0E+15 | 30 | 230 | 1.00 |
| D5 | Ar$^+$ | 5.0E+14 | 30 | 527 | 1.00 |
| D7 | Ar$^+$ | 5.0E+15 | 20 | 57 | 0.12 |
| D9 | Ar$^+$ | 1.0E+15 | 20 | 376 | 1.00 |
| D11 | Ar$^+$ | 5.0E+14 | 20 | 911 | 1.00 |
| D13 | Ar$^+$ | 5.0E+15 | 10 | 151 | 0.21 |
| D15 | Ar$^+$ | 1.0E+15 | 10 | 1585 | 1.00 |
| D17 | Ar$^+$ | 5.0E+14 | 10 | 2337 | 1.00 |
| D19 | Ar$^+$ | 5.0E+15 | 5 | 1028 | 0.86 |
| D21 | Ar$^+$ | 1.0E+15 | 5 | 2488 | 1.00 |
| D23 | Ar$^+$ | 5.0E+14 | 5 | 2993 | 1.00 |
| D25 | reference(no) | 0 | 0 | 4275 | 1.00 |

As seen from Table 1 and FIGS. 3 and 4, when the ion beam dose (Dose) is set to $1\times10^{15}$ to $5\times10^{15}$/cm$^2$, the coercive force Hc becomes small. This represents that a region irradiated with an ion beam is soft-magnetized. From this result, it is seen that if regions to be irradiated with an ion beam are set by, for example, the method described using FIG. 1(b) or the like, it is possible to properly form magnetic field shield portions 202 and hard magnetic portions 204 in a continuous film layer 24. When the ion beam dose (Dose) is set to $5\times10^{15}$/cm$^2$, the squareness ratio S becomes small. This represents that a soft magnetic region having an axis of easy magnetization in an in-plane direction parallel to a main surface of a substrate 12 is formed by ion-beam irradiation.

The ion beam dose (Dose) may be greater than $5\times10^{14}$/cm$^2$. For example, the ion beam dose (Dose) may be $1\times10^{14}$ to $5\times10^{16}$/cm$^2$. When forming the soft magnetic region having the axis of easy magnetization in the in-plane direction parallel to the main surface of the substrate 12, the ion beam dose (Dose) is preferably set to, for example, $5\times10^{14}$ to $5\times10^{16}$/cm$^2$.

The ion irradiation energy is preferably set to 5 to 30 KeV and more preferably 10 to 30 KeV. If the energy is too small, the soft magnetic region cannot be properly formed. If the energy is too large, there is a possibility that an ion beam passes through the layer and further exerts an influence upon a lower layer.

The ion-beam irradiation process may irradiate, for example, an ion beam of phosphorus ions (P$^+$) or the like. Alternatively, use may be made of an ion beam of He, B, C, N, Ne, Ar, Cr, Co, Kr, Xe, Pt, or the like.

FIG. 5 shows a second example of an ion-beam irradiation method in the ion-beam irradiation process. In this example, the ion-beam irradiation process uses a resist mask 44 formed by the nanoimprint technique.

In this ion-beam irradiation process, as shown in FIG. 5(a), the resist mask 44 is formed by, for example, using a nanoimprint mold 46 to emboss a resist film coated on a continuous film layer 24. Then, as shown in FIG. 5(b), irradiation of an ion beam 42 is carried out using the resist mask 44 as a mask, thereby forming magnetic field shield portions 202 in the continuous film layer 24.

After forming the magnetic field shield portions 202, as shown in FIG. 5(c), the resist mask 44 is removed by, for example, ashing and cleaning. Also with this configuration, the magnetic field shield portions 202 can be properly formed. After the ion-beam irradiation process, as shown in FIG. 5 (d), for example, a carbon-overcoat protective layer 26 is formed on the continuous film layer 24 in a protective layer forming process.

Embodiment 2

Hereinbelow, another embodiment according to this first invention will be described with reference to FIG. 7.

In this example, a magnetic recording medium 10 comprises a substrate 12, an adhesive layer 14, a soft magnetic layer 16, an underlayer 18, a perpendicular magnetic recording layer 30, a protective layer 26, and a lubricating layer 28 in this order. The perpendicular magnetic recording layer 30 comprises a granular layer 20 and a magnetically coupling layer 24' (not continuous layers but a single layer) stacked in this order.

In this example, the substrate 12, the adhesive layer 14, the soft magnetic layer 16, the underlayer 18, the protective layer 26, and the lubricating layer 28 are the same as those in the above-mentioned embodiment 1 and thus description thereof is omitted.

In the embodiment 2, the magnetically coupling layer forms a thin film, which exhibits perpendicular magnetic anisotropy, on the magnetic recording layer with a granular structure and is magnetically coupled to the perpendicular magnetic recording layer by exchange interaction between the magnetic recording layer and the magnetically coupling layer that is magnetically coupled to magnetic grains in the magnetic recording layer.

As an example of the magnetically coupling layer, there can be cited an alloy-based material such as CoCr, CoCrTa, CoCrPt, CoCrPtTa, or CoCrPtB.

The magnetically coupling layer preferably contains at least CoCrPt and, if it mainly contains CoCrPt, it is possible to add high heat resistance in addition to high-density recordability and low noise of the granular layer.

The magnetically coupling layer has a non-granular structure containing no metal oxide or nitride at the grain boundaries (nonmagnetic grain boundaries) of magnetic grains.

The thickness of the magnetically coupling layer is, for example, 1 to 10 nm and preferably 2 to 9 nm.

The thickness of the magnetically coupling layer is preferably half or less of that of the granular layer and more preferably one-third or less thereof. The lower limit of the thickness is greater than zero and is preferably set to a value that enables the magnetically coupling layer to exhibit its function.

In the embodiment 2, the granular layer is preferably a CoCrPt—$SiO_2$—$TiO_2$ layer. Further, the thickness of the magnetically coupling layer is preferably set thinner than conventional. The reasons therefor will be described hereinbelow.

When the granular layer is a CoCrPt—$SiO_2$ layer, a high SN ratio cannot be obtained unless the thickness of the magnetically coupling layer is set to a certain high value. However, as the thickness of the magnetically coupling layer increases, the coercive force Hc decreases. Further, if the thickness of the magnetically coupling layer is large, since it is necessary to change the properties over the entire thickness, the change in properties (e.g. soft magnetization) by ion-beam irradiation is hard to occur.

In contrast, when the granular layer is the CoCrPt—$SiO_2$—$TiO_2$ layer, the grain boundaries of magnetic grains in the granular layer become clearer as compared with the case where the granular layer is the CoCrPt—$SiO_2$ layer, and thus the coercive force Hc becomes higher as compared with the case where the granular layer is the CoCrPt—$SiO_2$ layer.

Therefore, even if the thickness of the magnetically coupling layer is set relatively thin as compared with conventional values, a relatively high coercive force Hc can be obtained.

If the thickness of the magnetically coupling layer can be made thin, it is possible to properly carry out magnetic isolation between recording regions in addition to the fact that the change in properties (e.g. soft magnetization) by ion-beam irradiation is facilitated. Therefore, for example, it is possible to make the magnetic recording medium properly function as a DTR medium or a patterned medium.

In this example, magnetic shield portions 202 are formed in part of the magnetically coupling layer 24'. The magnetic shield portions 202 are regions for magnetically isolating a plurality of recording regions from each other, where magnetic signals are to be respectively recorded, in the perpendicular magnetic recording layer 30. In this example, the magnetic shield portions 202 are soft magnetic regions and are formed by, for example, changing the crystal structure of the magnetically coupling layer 24' being a single-layer film by ion-beam irradiation. In the magnetically coupling layer 24', regions where the magnetic shield portions 202 are not formed serve as hard magnetic portions 204 that exhibit perpendicular magnetic anisotropy.

Hereinbelow, the method of forming the magnetic shield portions 202 and the hard magnetic portions 204 of the magnetically coupling layer 24' will be described in further detail. In this example, the magnetic shield portions 202 and the hard magnetic portions 204 are formed by a recording layer forming process and an ion-beam irradiation process. The recording layer forming process is a process of forming the granular layer 20 and the magnetically coupling layer 24' over the underlayer 18 and forms, as the magnetically coupling layer 24', a single-layer film being a CoCrPt layer or a CoCrPtB layer.

The ion-beam irradiation process is a process of irradiating an ion beam on part of the magnetically coupling layer 24' and forms the magnetic shield portions 202 by soft-magnetizing regions irradiated with the ion beam. Regions not irradiated with the ion beam are left remaining as the hard magnetic portions 204. By this, the ion-beam irradiation process forms the magnetic shield portions 202 and the hard magnetic portions 204 in the magnetically coupling layer 24'.

FIG. 1 (b) shows a first example of an ion-beam irradiation method. In this example, the ion-beam irradiation process uses a silicon stencil mask 40 to set regions, to be irradiated with an ion beam 42, on the magnetically coupling layer 24. Then, the magnetic shield portions 202 are formed by irradiating the ion beam 42 on those regions. With this configuration, it is possible to accurately set the regions to be irradiated with the ion beam 42. Therefore, according to this example, the magnetic shield portions 202 can be properly formed with high accuracy.

Herein, the ion-beam irradiation process forms the magnetic shield portions 202, being soft magnetic, in the regions irradiated with the ion beam 42 by, for example, changing the crystal structure of the magnetically coupling layer 24 by the energy of the ion beam 42. In this case, the ion-beam irradiation process may form the magnetic shield portions 202 so that the entire perpendicular magnetic recording layer 30 combining the granular layer 20 and the magnetically coupling layer 24 exhibits the soft magnetic properties. The ion-beam irradiation process preferably forms the magnetic shield portions 202 having an axis of easy magnetization in an in-plane direction parallel to a main surface of the substrate 12. With this configuration, it is possible to more appropriately block a recording magnetic field extending in a direction parallel to the main surface of the substrate 12 by the magnetic shield portions 202.

In this example, the magnetically coupling layer 24' is the single-layer film being the CoCrPt layer or the CoCrPtB layer. This single-layer film exhibits perpendicular magnetic anisotropy due to interface magnetic anisotropy. The ion-beam irradiation process forms the magnetic shield portions 202 by irradiating the ion beam 42 on this single-layer film to form an alloy of metals contained in the single-layer film. This makes the interface state of the magnetic shield portions 202 different from that of the hard magnetic portions 204 being the regions not irradiated with the ion beam so that the magnetic shield portions 202 become soft magnetic regions that exhibit substantially no perpendicular magnetic anisotropy due to interface magnetic anisotropy. Therefore, according to this example, the magnetic shield portions 202 can be properly formed by ion-beam irradiation. Further, it is possible to form the magnetic shield portions 202 substantially only in the magnetically coupling layer 24' of the respective layers included in the perpendicular magnetic recording layer 30.

Herein, in this example, the ion-beam irradiation process forms the magnetic shield portions 202 by changing the interface state of the magnetically coupling layer 24' by ion-beam irradiation. This change in interface state occurs with a smaller ion beam dose (Dose) as compared with, for example, the case of changing the state of the magnetically coupling layer 24' over the entire thickness thereof. Therefore, according to this example, the magnetic shield portions 202 can be properly formed with a small ion beam dose. Further, in this case, for example, since it becomes possible to narrow a range affected by the ion beam, ion-beam irradiation can be performed with higher accuracy. This makes it possible to accurately form the magnetic shield portions 202.

Further, the magnetic shield portions 202, being soft magnetic, can be formed with a smaller ion beam dose as compared with, for example, nonmagnetic regions. Therefore, according to this example, the magnetic shield portions 202 can be formed with a smaller ion beam dose. This makes it possible to form the magnetic shield portions 202 with higher accuracy.

FIG. 5 shows a second example of an ion-beam irradiation method in the ion-beam irradiation process. In this example, the ion-beam irradiation process uses a resist mask 44 formed by the nanoimprint technique.

In this ion-beam irradiation process, as shown in FIG. 5(a), the resist mask 44 is formed by, for example, using a nanoimprint mold 46 to emboss a resist film coated on a magnetically coupling layer 24. Then, as shown in FIG. 5(b), irradiation of an ion beam 42 is carried out using the resist mask 44 as a mask, thereby forming magnetic shield portions 202 in the magnetically coupling layer 24.

Hereinbelow, this first invention will be described in further detail using Examples.

Example 1

Using an evacuated film forming apparatus, an adhesive layer 14 and a soft magnetic layer 16 are formed in sequence on an aluminosilicate glass substrate 12 in an Ar atmosphere by a DC magnetron sputtering method. In this event, the adhesive layer 14 is formed using a CrTi target so as to be a CrTi layer with a thickness of 10 nm. The soft magnetic layer 16 is formed using a CoTaZr target so as to be an amorphous CoTaZr layer with a total thickness of 50 nm. For controlling magnetic domains, the soft magnetic layer 16 has a two-layer structure with a Ru layer with a thickness of 0.9 nm interposed therebetween.

After forming the soft magnetic layer 16, continuously, a Ta layer (thickness 3 nm) serving as a first orientation control layer and Ru layers (thickness 20 nm) serving as a second orientation control layer and an isolation promoting layer are formed as an underlayer 18 in the Ar atmosphere by the DC magnetron sputtering method. Then, a granular layer 20 having a thickness of 9 nm and containing magnetic grains 102 with an hcp crystal structure is formed using a hard magnetic target made of CoCrPt—$SiO_2$.

Further, using a low-pressure Ar gas as a sputtering gas, a Pd layer (thickness 0.8 nm) is formed as a coupling control layer 22 and $[CoCr/Pd]_3$ layers are formed as a continuous film layer 24. The thickness of each CoCr layer is set to 0.4 nm and the thickness of each Pd layer is set to 0.9 nm. The thickness of the continuous film layer 24 in which the CoCr layers and the Pd layers are alternately laminated by three layers for each is 4 nm (3.9 to 4 nm).

An ion beam 42 of argon ions ($Ar^+$) accelerated with an energy of 30 KeV is irradiated on a medium formed with the layers up to the continuous film layer 24, using a stencil mask 40 as described using FIG. 1(b), thereby forming magnetic field shield portions 202 in regions between tracks. In this ion-beam irradiation, the ion beam dose is set to $5\times10^{15}/cm^2$. The width, in a track width direction, of each formed magnetic field shield portion 202 is 50 nm. The track width is 150 nm and the track interval is 200 nm.

Then, using a mixed gas containing Ar and 30% hydrogen and using a carbon target as a sputtering target, a protective layer 26 made of hydrogenated carbon (hydrogenated carbon) is formed. Since the film hardness is improved by the use of the hydrogenated carbon, it is possible to properly protect the perpendicular magnetic recording layer 30 against an impact from a head. Thereafter, a lubricating layer 28 made of PFPE (perfluoropolyether) is formed by a dip coating method. The thickness of the lubricating layer 28 is nm. In this manner, a magnetic recording medium 10 according to Example 1 is fabricated.

Comparative Example 1

A magnetic recording medium according to Comparative Example 1 is fabricated in the same manner as in Example 1 except that the coupling control layer 22 and the continuous film layer 24 are not formed. The magnetic recording medium according to Comparative Example 1 is a granular medium. The granular medium is a magnetic recording medium in which a perpendicular magnetic recording layer is formed only by a magnetic layer that is the same as or similar to the granular layer 20. In this granular medium, the thickness of the granular layer is 30 nm.

Comparative Example 2

A magnetic recording medium according to Comparative Example 2 is fabricated in the same manner as in Example 1 except that the magnetic field shield portions 202 are not formed. The magnetic recording medium according to Comparative Example 2 is a CGC medium provided with no magnetic field shield portions 202 (hereinafter referred to as a conventional type CGC medium).

(Evaluation)

FIG. 6 shows the simulation results of recording patterns of information recorded in the magnetic recording media according to Comparative Examples 1 and 2. FIG. 6(a) shows the recording pattern in the granular medium being the magnetic recording medium according to Comparative Example 1.

In the granular medium, since a continuous film layer is not provided, the thermal stability of recorded signals is lowered as compared with, for example, a CGC medium or the like. Therefore, in a recording track, magnetization of regions indicative of respective bits of the recording pattern is partially reversed due to a thermal fluctuation phenomenon or the like. Such reversal of the magnetization has a possibility of causing loss of recorded information and thus becomes an obstacle to an increase in recording density. Therefore, with the granular medium, it is difficult to realize a recording density, for example, exceeding 200 Gbits per square inch.

FIG. 6 (b) shows the recording pattern in the conventional type CGC medium being the magnetic recording medium according to Comparative Example 2. In the conventional type CGC medium, the thermal stability of recorded signals can be improved by pinning (Pinning) magnetization of a continuous film layer using magnetization of a granular layer. Therefore, reversal of magnetization due to a thermal fluctuation phenomenon or the like is hard to occur and thus the increase in density is enabled as compared with the granular medium.

However, in the conventional type CGC medium or the like, the control of magnetic recording regions in the track width (Erase width) direction becomes very difficult due to the provision of the continuous film layer. As a result, for example, gray regions where the value of a recorded signal takes a value between 0 and 1 extend in the track width direction and thus it is difficult to reduce track edge noise.

This is because the continuous film layer being an auxiliary magnetic layer serving an auxiliary role for the granular layer being a main recording layer (main recording layer) has a magnetically coupling force in a direction parallel to the main surface of the substrate and thus a recording region extends as seen from a head. Those portions extending with respect to the recording region are gray regions and, if these regions are large, the track width is assumed to be wide.

For example, in the case shown in FIG. 6 (b), the recording pattern is formed wherein gray regions extend outside the width of a recording track indicated by a rectangle 50. Such gray regions become a source of track edge noise generation. Therefore, in the conventional type CGC medium, when, for example, realizing a recording density exceeding 200 Gbits per square inch, the SN ratio decreases so that it is difficult to properly improve the track density.

In contrast, in the magnetic recording medium 10 according to Example 1, sufficient thermal stability can be obtained by the CGC medium structure as compared with, for example, the magnetic recording medium according to Comparative Example 1. Further, by the formation of the magnetic field shield portions 202, when recording a magnetic signal on a track, it is possible to block a recording magnetic field extending toward the outside of the track, thereby preventing the recording magnetic field from extending outside the track. By this, in Example 1, it is possible to prevent gray regions from extending outside the track width.

Therefore, the track edge noise can be reduced as compared with, for example, the magnetic recording medium according to Comparative Example 2. For example, in the magnetic recording medium 10 according to Example 1, the SN ratio is improved by about 1.0 to 3.5 dB as compared with the magnetic recording medium according to Comparative Example 2. This makes it possible to realize, for example, a recording density exceeding 200 Gbits per square inch and, further, a recording density exceeding 500 Gbits per square inch.

Example 2

Using an evacuated film forming apparatus, an adhesive layer 14 and a soft magnetic layer 16 are formed in sequence on an aluminosilicate glass substrate 12 in an Ar atmosphere by a DC magnetron sputtering method (see FIG. 7). In this event, the adhesive layer 14 is formed using a CrTi target so as to be a CrTi layer with a thickness of 10 nm. The soft magnetic layer 16 is formed using a CoTaZr target so as to be an amorphous CoTaZr layer with a total thickness of 50 nm. For controlling magnetic domains, the soft magnetic layer 16 has a two-layer structure with a Ru layer with a thickness of 0.9 nm interposed therebetween.

After forming the soft magnetic layer 16, continuously, a Ta layer (thickness 3 nm) serving as a first orientation control layer and Ru layers (thickness 20 nm) serving as a second orientation control layer and an isolation promoting layer are formed as an underlayer 18 in the Ar atmosphere by the DC magnetron sputtering method. Then, a granular layer 20 having a thickness of 9 nm and containing magnetic grains 102 with an hcp crystal structure is formed using a hard magnetic target made of CoCrPt—SiO$_2$.

Further, using a CoCrPt target or a CoCrPtB target and using a low-pressure Ar gas as a sputtering gas, a CoCrPt layer (thickness 7 nm) or a CoCrPtB layer (thickness 7 nm) is formed as a magnetically coupling layer 24'.

An ion beam 42 of argon ions (Ar$^+$) accelerated with an energy of 30 KeV is irradiated on a medium formed with the layers up to the magnetically coupling layer 24', using a resist mask 44 formed by the nanoimprint technique as described using FIG. 5(a), thereby forming magnetic field shield portions 202 in regions between tracks. In this ion-beam irradiation, the ion beam dose is set to 5×10$^{15}$/cm$^2$. The width, in a track width direction, of each formed magnetic field shield portion 202 is 50 nm. The track width is 150 nm and the track interval is 200 nm.

Then, using a mixed gas containing Ar and 30% hydrogen and using a carbon target as a sputtering target, a protective layer 26 made of hydrogenated carbon (hydrogenated carbon) is formed. Since the film hardness is improved by the use of the hydrogenated carbon, it is possible to properly protect the perpendicular magnetic recording layer 30 against an impact from a head. Thereafter, a lubricating layer 28 made of PFPE (perfluoropolyether) is formed by a dip coating method. The thickness of the lubricating layer 28 is 1 nm. In this manner, a magnetic recording medium 10 according to Example 1 is fabricated.

Comparative Example 3

A magnetic recording medium according to Comparative Example 3 is fabricated in the same manner as in Example 2 except that the magnetic field shield portions 202 are not formed.

(Evaluation)

In the magnetic recording medium 10 according to Example 2, by the formation of the magnetic field shield portions 202, when recording a magnetic signal on a track, it is possible to block a recording magnetic field extending toward the outside of the track, thereby preventing the recording magnetic field from extending outside the track. By this, in Example 2, it is possible to prevent gray regions from extending outside the track width.

Therefore, the track edge noise can be reduced as compared with, for example, the magnetic recording medium according to Comparative Example 3. For example, in the magnetic recording medium 10 according to Example 2, the SN ratio is improved by about 1.0 to 3.5 dB as compared with the magnetic recording medium according to Comparative Example 3. This makes it possible to realize, for example, a recording density exceeding 200 Gbits per square inch and, further, a recording density exceeding 500 Gbits per square inch.

Next, the second invention will be described.

Disclosure of the Invention about the Second Invention

Problem to be Solved by the Invention about the Second Invention

As described above, in a DTR medium, a patterned medium, or the like, as the track density increases, the width of an isolation region formed in a region between tracks decreases. Therefore, for example, when forming a groove or the like as the isolation region by a mechanical method, the ratio of the depth to the width (aspect ratio) becomes so large that accurate processing of the isolation region becomes difficult.

Taking this into account, the inventors of this application have made studies on forming an isolation region by irradiating an ion beam on a magnetic recording layer to change the magnetic properties in a region of part of the magnetic recording layer, i.e. not by a mechanical method such as formation of a groove. The region to be irradiated with an ion beam is set using, for example, a stencil mask or a resist mask formed by the nanoimprint technique. According to this method, it is possible to accurately set the region to be irradiated with an ion beam. Therefore, even if the track density is high, the isolation region can be accurately formed as compared with, for example, the case of forming an isolation region such as a groove.

Even in the case of forming the isolation region by ion-beam irradiation, however, if the required ion beam dose (Dose) becomes large, there is a possibility that, for example, a region affected by ion-beam irradiation spreads and thus it becomes difficult to accurately form the isolation region. Therefore, when forming the isolation region by ion-beam irradiation, it is desirable to form the isolation region with a smaller ion beam dose.

It is therefore an object of this invention to provide a magnetic recording medium manufacturing method and a magnetic recording medium, which can solve the above-mentioned problems.

As described above, conventionally, as a method of manufacturing a DTR medium, there is also known the method of locally implementing Ag ions into a thin film having a predetermined composition (see, e.g. Patent Document 2). In this method, a portion where no Ag ions are implemented serves as a portion having a smaller coercive force. However, in this case, since a region where Ag ions are implemented serves as a recording region, if the implantation dose is reduced, there is a possibility that variation in magnetic properties in the recording region increases. Therefore, according to the method of Patent Document 2, it is considered to be difficult to reduce the ion beam dose.

Means for Solving the Problem about the Second Invention

The inventors of this application have made intensive studies on a structure suitable for forming an isolation region with a smaller ion beam dose. Then, they have found that, for example, in the case of an isolation region of a soft magnetic region, it can be formed with a smaller ion beam dose as compared with a nonmagnetic isolation region. Further, they have found that, in the case of forming either a soft magnetic isolation region or a nonmagnetic isolation region, if a magnetic layer exhibits perpendicular magnetic anisotropy due to interface magnetic anisotropy, the isolation region can be formed with a smaller ion beam dose by changing the state of the interface with ion-beam irradiation. This second invention has the following configurations.

(Configuration 13)

A magnetic recording medium manufacturing method comprising:

a recording layer forming step of forming a magnetic recording layer having at least one magnetic layer, and an ion-beam irradiation step of irradiating an ion beam on regions respectively between a plurality of recording regions, where magnetic signals are to be respectively recorded, in the magnetic recording layer, thereby forming soft magnetic regions respectively between the plurality of recording regions in the magnetic layer. In the magnetic layer of the magnetic recording layer, regions irradiated with no ion beam become, for example, hard magnetic portions.

When configured in this manner, the soft magnetic regions function as, for example, isolation regions for magnetically isolating the recording regions from each other. Therefore, with this configuration, it is possible to properly carry out magnetic isolation between the recording regions. For example, it is possible to make the magnetic recording medium properly function as a DTR medium or a patterned medium. By this, for example, since the track edge noise is reduced, it is possible to reduce the track width (Erase width) and thus to improve the track density.

Further, the soft magnetic regions can be formed with a smaller ion beam dose as compared with, for example, nonmagnetic regions. Therefore, with this configuration, it becomes possible to reduce the ion beam dose and, for example, to narrow a range affected by the ion beam. This makes it possible to carry out the ion-beam irradiation with higher accuracy. Therefore, even if the track density is high, the isolation regions can be formed with sufficient accuracy.

Further, for example, when the track density becomes high and the width of isolation regions becomes small, there is a case where magnetic isolation between recording regions becomes insufficient with a structure in which nonmagnetic isolation regions are formed. For example, when recording a magnetic signal in the recording region, there is a possibility that a recording magnetic field extends exceeding the isolation regions to affect the adjacent recording regions. In contrast, the soft magnetic isolation regions serve as regions to restrict passage of a magnetic field and thus function as magnetic field shield portions that prevent extension of the magnetic field.

Therefore, according to Configuration 13, when carrying out magnetic recording in each recording region, it is possible to block a recording magnetic field extending toward the outside of the recording region, thereby making the boundaries of the recording magnetic field sharp. This makes it possible to properly prevent the influence of the recording magnetic field from being exerted on the adjacent recording regions. Therefore, magnetic isolation between the recording regions can be more appropriately carried out.

Herein, the recording region of the magnetic recording layer is, for example, a recording region corresponding to a track extending in a direction in which a head relatively scans a magnetic recording medium. In the magnetic recording medium, a plurality of tracks are disposed with a constant gap defined between the adjacent tracks, for example. When the magnetic recording medium is a magnetic disk, a plurality of tracks are disposed in concentric circles surrounding the center of the magnetic disk.

The soft magnetic regions serving as the isolation regions are formed in non-recording regions where a magnetic signal is not recorded in the magnetic recording layer. For example, the soft magnetic regions are each formed in a guard band region being a gap region between the adjacent tracks. In this case, the magnetic recording medium becomes, for example, a DTR medium. The recording regions of the magnetic recording layer may be regions corresponding to magnetic recording bits on the tracks. In this case, for example, soft magnetic regions are also formed in regions each located between the bits on the tracks. In this case, the magnetic recording medium becomes, for example, a patterned medium.

Conventionally, as a method of forming guard band regions from a soft magnetic material, there is also known a method of forming a magnetic recording layer in grooves formed by patterning a soft magnetic layer (SUL layer) located under the magnetic recording layer (S. Takahashi, K. Yamakawa, K. Ouchi, and S. Iwasaki, J. MMM. 287(2005)260). However, according to this method, there is a possibility that the process is complicated to cause an increase in cost. Further, since patterning of the soft magnetic layer is required, there is a possibility that it becomes difficult to implement processing with sufficient accuracy for high recording density. This is because since the soft magnetic layer is normally as thick as 10 to 100 nm, it cannot be processed with high accuracy. In contrast, according to Structure 13, the soft magnetic regions can be formed by an extremely simplified process.

(Configuration 14)

The recording layer forming step forms the magnetic recording layer over a substrate, and the ion-beam irradiation step forms the soft magnetic regions having an axis of easy magnetization in an in-plane direction parallel to a main surface of the substrate. With this configuration, it is possible to more appropriately block a recording magnetic field extending toward the adjacent recording regions.

(Configuration 15)

The recording layer forming step forms the magnetic recording layer having the magnetic layer that exhibits perpendicular magnetic anisotropy due to interface magnetic anisotropy, and the ion-beam irradiation step forms the soft magnetic regions by changing an interface state of the magnetic layer by irradiation of the ion beam. The perpendicular magnetic anisotropy is, for example, a magnetic anisotropy in which the magnetic moment tends to turn in a direction perpendicular to a main surface of a substrate.

The change in interface state of the magnetic layer occurs with a smaller ion beam dose as compared with, for example, the case of changing the state of the magnetic layer over the entire thickness thereof. Therefore, with this configuration, the isolation regions can be formed with a smaller ion beam dose.

(Configuration 16)

The recording layer forming step forms the magnetic recording layer having the magnetic layer that exhibits perpendicular magnetic anisotropy due to interface magnetic anisotropy, and the ion-beam irradiation step changes the regions irradiated with the ion beam in the magnetic layer to regions that exhibit substantially no perpendicular magnetic anisotropy due to interface magnetic anisotropy.

When formed in this manner, the regions that exhibit substantially no perpendicular magnetic anisotropy in the magnetic layer function as the isolation regions. Therefore, with this configuration, the isolation regions can be properly formed. Exhibiting substantially no perpendicular magnetic anisotropy due to interface magnetic anisotropy represents, for example, that the perpendicular magnetic anisotropy exhibited by the region with respect to a magnetic signal to be recorded in the magnetic recording layer has a magnitude that causes no problems.

(Configuration 17)

The magnetic layer of the magnetic recording layer is a multilayer film, and the ion-beam irradiation step forms the soft magnetic regions by forming an alloy of metals contained in respective layers of the multilayer film by irradiation of the ion beam. With this configuration, the isolation regions can be properly formed with a smaller ion beam dose.

(Configuration 18)

The magnetic recording layer comprises a main recording layer for recording a magnetic signal and an auxiliary magnetic layer magnetically coupled to the main recording layer, and the ion-beam irradiation step irradiates the ion beam on the auxiliary magnetic layer, thereby forming the soft magnetic regions substantially only in the auxiliary magnetic layer out of the main recording layer and the auxiliary magnetic layer.

There is a case where the magnetic recording layer has a plurality of magnetic layers having different compositions. For example, in a CGC medium, a magnetic recording layer comprises a granular layer serving as a main recording layer and a continuous film layer serving as an auxiliary magnetic layer. With respect to such a magnetic recording layer, if, for example, an attempt is made to form soft magnetic regions in both the main recording layer and the auxiliary magnetic layer, there is a possibility that the required ion beam dose increases.

Taking this into account, the inventors of this application have found that recording regions can be magnetically isolated from each other by forming soft magnetic isolation regions only in the auxiliary magnetic layer without forming the soft magnetic regions also in the main recording layer. With this configuration, since it becomes unnecessary to form the isolation regions over the entire thickness of the magnetic recording layer, the isolation regions can be properly formed with a smaller ion beam dose. This makes it possible to form the isolation regions with higher accuracy.

The auxiliary magnetic layer is, for example, a magnetic layer being auxiliary in the magnetic recording layer and is not necessarily a layer for recording a magnetic signal. The auxiliary magnetic layer is, for example, a magnetic layer having a smaller thickness than the main recording layer or a magnetic layer having a smaller coercive force than the main recording layer. In the main recording layer, the recording regions are defined by, for example, magnetic influence received from the auxiliary magnetic layer. The soft magnetic region formed in the auxiliary magnetic layer may be a region where the magnetic properties of the entire magnetic recording layer, at that position, combining the main recording layer and the auxiliary magnetic layer exhibit the soft magnetic properties. Forming the soft magnetic regions substantially only in the auxiliary magnetic layer also includes, for example, the case where the soft magnetic regions are also formed in part of the main recording layer in a range not affecting the accuracy of and the number of processes for formation of the soft magnetic regions.

The auxiliary magnetic layer is preferably a magnetic layer in which the width of the grain boundaries of magnetic grains contained in the regions irradiated with no ion beam is smaller than that of the grain boundaries of magnetic grains in the main recording layer. It is preferable that the magnetic grains contained in the regions irradiated with no ion beam in the auxiliary magnetic layer be exchange-coupled to each other with a coupling force greater than that between the magnetic grains of the main recording layer in a direction parallel to the main surface of the substrate. With this configuration, for example, it is possible to improve the thermal stability of signals recorded in the main recording layer. The grain boundary of magnetic grains is a region where, for example, atomic arrangement at a boundary between magnetic grains is disturbed, and is, for example, a region occupied by impurities precipitated between uniform magnetic grains whose axes of easy magnetization agree with each other. The width of the grain boundaries of the magnetic grains contained in the regions irradiated with no ion beam in the auxiliary magnetic layer being smaller than that of the grain boundaries of the magnetic grains in the main recording layer also includes, for example, the case where the auxiliary magnetic layer is a layer with an amorphous structure or the like with substantially no grain boundaries present.

The difference in magnetic properties between the soft magnetic region and the other region in the auxiliary magnetic layer may be, for example, the difference in magnetic properties of the entire magnetic layer, at that position, combining the main recording layer and the auxiliary magnetic layer. The magnetic recording medium having the magnetic recording layer comprising the main recording layer and the auxiliary magnetic layer is not limited to the CGC medium and may alternatively be, for example, an exchange spring (Exchange Spring) medium, an exchange coupled composite (ECC: Exchange Coupled Composite) medium, or the like having a soft magnetic layer as an auxiliary magnetic layer.

(Configuration 19)

The main recording layer is a layer with a granular structure in which a nonmagnetic substance is segregated at grain boundaries of magnetic grains, and the auxiliary magnetic layer is a multilayer film in which layers of a Co compound and Pd layers or Pt layers are alternately laminated.

When configured in this manner, the magnetic recording medium becomes, for example, a CGC medium. In this case, magnetic isolation between the recording regions can be properly carried out by forming the soft magnetic regions in the auxiliary magnetic layer. Therefore, it becomes possible to make the magnetic recording medium properly function as a DTR medium or a patterned medium and to improve the track density. The above-mentioned nonmagnetic substance is, for example, an oxide. This oxide is preferably a metal oxide.

(Configuration 20)

A method of manufacturing a magnetic recording medium for a perpendicular magnetic recording system, the method comprising:

a recording layer forming step of forming a magnetic recording layer having a magnetic layer that exhibits perpendicular magnetic anisotropy due to interface magnetic anisotropy, and an ion-beam irradiation step of irradiating an ion beam on regions respectively between a plurality of recording regions, where magnetic signals are to be respectively recorded, in the magnetic recording layer to change an interface state of the regions, thereby changing the regions irradiated with the ion beam in the magnetic layer to regions that exhibit substantially no perpendicular magnetic anisotropy due to interface magnetic anisotropy.

When formed in this manner, the regions that exhibit substantially no perpendicular magnetic anisotropy in the magnetic layer function as the isolation regions. Therefore, with this configuration, the isolation regions can be properly formed. Changing the regions irradiated with the ion beam to regions that exhibit substantially no perpendicular magnetic anisotropy due to interface magnetic anisotropy can be performed by, for example, changing the interface state of the magnetic layer. The change in interface state of the magnetic layer occurs with a smaller ion beam dose as compared with, for example, the case of changing the state of the magnetic layer over the entire thickness thereof. Therefore, with this configuration, the isolation regions can be formed with a smaller ion beam dose.

The ion-beam irradiation process forms, for example, soft magnetic regions in the regions irradiated with the ion beam in the magnetic layer. The ion-beam irradiation process may form nonmagnetic regions instead of the soft magnetic regions. With respect to the other points, Configuration 20 may be the same as or similar to Configurations 13 to 19.

(Configuration 21)

A magnetic recording medium for a perpendicular magnetic recording system, comprising:

a magnetic recording layer having a magnetic layer that exhibits perpendicular magnetic anisotropy due to interface magnetic anisotropy, wherein the magnetic layer comprises;

a plurality of hard magnetic portions respectively formed at positions corresponding to recording regions, where magnetic signals are to be recorded, in the magnetic recording layer and adapted to exhibit perpendicular magnetic anisotropy due to interface magnetic anisotropy, and isolation regions formed between the plurality of hard magnetic portions, respectively, to magnetically isolate the plurality of hard magnetic portions from each other, the isolation regions having an interface state different from that of the hard magnetic portions and adapted to exhibit substantially no perpendicular magnetic anisotropy due to interface magnetic anisotropy. With this configuration, it is possible to obtain an effect similar to that of Configuration 20.

Another aspect of this second invention is a mode wherein, in the above-mentioned Structure 18 and the like, the main recording layer is a layer with a granular structure in which a nonmagnetic substance is segregated at the grain boundaries of magnetic grains, and the auxiliary magnetic layer is a magnetically coupling layer magnetically coupled to the main recording layer.

In this aspect, (1) a granular magnetic recording layer is provided, (2) a magnetically coupling layer (not continuous layers but a single layer) is provided, (3) the magnetically coupling layer is magnetically coupled to the magnetic recording layer, and (4) the magnetically coupling layer has hard magnetic portions and soft magnetic portions with magnetism weaker than that of the hard magnetic portions. Further, the magnetic recording layer and the magnetically coupling layer are in contact with each other.

In such another aspect of this second invention, the contents in which "an auxiliary magnetic layer" is replaced by "a magnetically coupling layer" in the above-mentioned Configuration 18 and the like and the description thereof are applied. Further, in such another aspect of this second invention, the contents in which "a magnetic layer", "a recording layer", or "a magnetic recording layer" is replaced by "a layer in which a magnetic recording layer with a granular structure and a magnetically coupling layer magnetically coupled to magnetic grains in the magnetic recording layer are stacked in this order" in the above-mentioned Configurations 13 to 17, 20, and 21 and the description thereof are applied.

Such another aspect of this second invention includes the following configuration.

(Configuration 22)

A magnetic disk in which a magnetic recording layer with a granular structure in which nonmagnetic grain boundary portions are formed between magnetic grains continuously grown in a columnar shape and a magnetically coupling layer magnetically coupled to the magnetic grains in the magnetic recording layer are stacked in this order over a nonmagnetic disk-shaped substrate, the magnetic disk wherein:

at least the magnetically coupling layer out of the magnetically coupling layer and the magnetic recording layer comprises hard magnetic portions and soft magnetic portions alternately adjacent to each other in a radial direction of said substrate.

With this configuration, it is possible to obtain an effect similar to that of the above-mentioned Configuration 13 or the like.

For example, when configured in this manner, the soft magnetic regions function as, for example, isolation regions for magnetically isolating recording regions from each other. Therefore, with this configuration, it is possible to properly carry out magnetic isolation between the recording regions. This makes it possible to make the magnetic recording medium properly function as, for example, a DTR medium or a patterned medium. By this, for example, since the track edge noise is reduced, it is possible to reduce the track width (Erase width) and thus to improve the track density.

Further, the soft magnetic regions can be formed with a smaller ion beam dose as compared with, for example, nonmagnetic regions. Therefore, with this configuration, it becomes possible to reduce the ion beam dose and, for example, to narrow a range affected by the ion beam. This makes it possible to carry out the ion-beam irradiation with higher accuracy. Therefore, even if the track density is high, the isolation regions can be formed with sufficient accuracy.

In such another aspect of this second invention, the magnetically coupling layer is a thin film, that exhibits perpendicular magnetic anisotropy, on the magnetic recording layer with the granular structure. By exchange interaction between the magnetic recording layer and the magnetically coupling layer magnetically coupled to magnetic grains in the magnetic recording layer, the perpendicular magnetic recording layer and the magnetically coupling layer are magnetically coupled to each other.

Such another aspect of this second invention further includes the following configurations.

(Configuration 23)

The magnetic disk, wherein the hard magnetic portions in the magnetically coupling layer are formed at positions corresponding to recording regions, where magnetic signals are to be recorded, of the magnetic recording layer and the soft magnetic portions are formed in regions other than the positions.

(Configuration 24)

The magnetic disk, wherein the soft magnetic portions and the hard magnetic portions are formed in concentric circles with respect to a center of the disk-shaped substrate.

(Configuration 25)

The magnetic disk, wherein the magnetic recording layer and the magnetically coupling layer are in contact with each other.

(Configuration 26)

The magnetic disk, wherein the magnetically coupling layer contains at least CoCrPt.

EFFECT OF THE INVENTION ABOUT THE SECOND INVENTION

According to this invention, for example, when isolation regions for magnetically isolating recording regions from each other are formed by ion-beam irradiation, the ion beam dose (Dose) can be reduced. Further, this makes it possible to accurately form the isolation regions.

BEST MODE FOR CARRYING OUT THE INVENTION ABOUT THE SECOND INVENTION

Embodiment 1

Hereinbelow, an embodiment according to this second invention will be described with reference to the drawings.

FIGS. 1, 2, 5, and 7 in the second invention are the same as FIGS. 1, 2, 5, and 7 in the first invention except that "magnetic shield portions 202" are changed to "isolation regions 202", and therefore, a description will be given with reference to FIGS. 1, 2, 5, and 7 in the first invention. Further, data obtained in FIGS. 3 and 4 in the second invention are the same as those in FIGS. 3 and 4 in the first invention and therefore a description will be given with reference to FIGS. 3 and 4 in the first invention.

FIG. 1 shows one example of a magnetic recording medium 10 according to the embodiment of this invention. FIG. 1 (a) shows one example of the structure of the magnetic recording medium 10. The magnetic recording medium 10 is a perpendicular two-layer medium type magnetic disk adapted to be mounted in a perpendicular magnetic recording type HDD (hard disk drive).

In this example, the magnetic recording medium 10 comprises a substrate 12, an adhesive layer 14, a soft magnetic layer 16, an underlayer 18, a perpendicular magnetic recording layer 30, a protective layer 26, and a lubricating layer 28 in this order. The perpendicular magnetic recording layer 30 comprises a granular layer 20, a coupling control layer 22, and a continuous film layer 24.

The substrate 12 is, for example, a glass for a base. As this base glass, there can be cited, for example, an aluminosilicate glass, an aluminoborosilicate glass, a soda-lime glass, or the like. Among them, the aluminosilicate glass is preferable. An amorphous glass or a crystallized glass can be used. For example, when the soft magnetic layer 16 has an amorphous structure, it is preferable that the base glass be the amorphous glass. Use of a chemically strengthened glass is preferable because the rigidity is high.

The surface roughness of a main surface of the substrate 12 is preferably 3 nm or less in Rmax and 0.3 nm or less in Ra. Rmax and Ra follow Japanese Industrial Standard (JIS). By providing such a smooth surface, for example, a gap between the perpendicular magnetic recording layer 30 and the soft magnetic layer 16 can be set constant so that it is possible to form a suitable magnetic circuit across a head (magnetic head), the perpendicular magnetic recording layer 30, and the soft magnetic layer 16. The substrate 12 may be a substrate having an isotropic surface with no texture.

For example, when magnetic field annealing is necessary for controlling magnetic domains of the soft magnetic layer 16, it is particularly preferable to use the substrate 12 being a glass base. Since the glass base is excellent in heat resistance, the heating temperature of the substrate 12 can be set high.

The adhesive layer 14 is a layer (adhesion layer) for improving the adhesion between the substrate 12 and the soft magnetic layer 16. By providing the adhesive layer 14, it is possible to prevent stripping of the soft magnetic layer 16. As a material of the adhesive layer 14, use can be made of, for example, a Ti-containing material. In terms of practical use, the thickness of the adhesive layer 14 is preferably set to 1 to 50 nm. In this example, the adhesive layer 14 is an amorphous CrTi layer. The thickness of the adhesive layer 14 is, for example, about 10 nm.

The soft magnetic layer 16 is a layer for forming a magnetic circuit between the head and the perpendicular magnetic recording layer 30. The soft magnetic layer 16 is not particularly limited as long as it is made of a magnetic substance that exhibits soft magnetic properties and, for example, preferably has as its magnetic property a coercive force Hc of 0.01 to 80 oersteds and more preferably 0.01 to 50 oersteds. Further, it preferably has as its magnetic property a saturation magnetic flux density Bs of 500 emu/cc to 1920 emu/cc.

As a material of the soft magnetic layer 16, there can be cited, for example, an Fe-based material, a Co-based material, or the like. For example, use can be made of an Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, an FeCo-based alloy soft magnetic material, or the like.

The thickness of the soft magnetic layer 16 is, for example, 10 to 200 nm and preferably 20 to 100 nm. When the thickness is less than 10 nm, there is a case where it becomes difficult to form a suitable magnetic circuit across the head, the perpendicular magnetic recording layer 30, and the soft magnetic layer 16, while, when the thickness exceeds 200 nm, there is a case where the surface roughness increases. Further, when the thickness exceeds 200 nm, there is a case where the magnetic domain control becomes difficult.

Herein, large magnetic domains tend to be formed in the soft magnetic layer 16. When large magnetic domains move, there is a possibility of noise generation. Therefore, the soft magnetic layer 16 preferably has a plurality of soft magnetic material layers antiferromagnetically coupled (AFC: Anti-Ferro Magnetically Coupled) to each other. With this configuration, it is possible to prevent noise generation by making the magnetic domains difficult to move.

In this example, the soft magnetic layer 16 comprises a plurality of CoTaZr layers antiferromagnetically coupled to each other through a Ru layer interposed therebetween. The Ru layer is, for example, a layer with an hcp crystal structure. The thickness of the Ru layer is, for example, about 0.9 nm. Each CoTaZr layer is a layer with an amorphous structure. The thickness of each CoTaZr layer is, for example, 20 to 27.5 nm.

The underlayer 18 is a layer for controlling the crystal structure of the perpendicular magnetic recording layer 30. The underlayer 18 may be a multilayer film of a plurality of kinds of films. In this example, the underlayer 18 comprises a first orientation control layer, a second orientation control layer, an isolation promoting layer, and a miniaturization promoting layer in this order over the soft magnetic layer 16.

The first orientation control layer is a layer for controlling the crystal orientation of the second orientation control layer being its upper layer. In this example, the first orientation control layer is, for example, a Ta layer or a CoCrTa layer with a bcc crystal structure close to amorphous. The thickness of the first orientation control layer is, for example, about 3 nm. The second orientation control layer is a layer for improving the orientation of the further upper layer. In this example, the second orientation control layer is a Ru layer with an hcp crystal structure. The thickness of the second orientation control layer is, for example, about 10 nm.

The isolation promoting layer is a layer for separating the composition of its upper layer to promote isolation of crystal grains. The isolation promoting layer is formed by a sputtering method in a state where, for example, the gas pressure is higher than that in forming the Ru layer being the second orientation control layer. By this, the isolation promoting layer becomes a layer in which crystals are small and crystal grains are away from each other. In this example, the isolation promoting layer is a Ru layer with an hcp crystal structure. The thickness of the isolation promoting layer is, for example, about 10 nm.

The miniaturization promoting layer is a layer for promoting miniaturization of crystal grains of its upper layer. In this example, the miniaturization promoting layer is a layer ($CoCr$—$SiO_2$ layer) with a nonmagnetic crystal grain granular structure in which $SiO_2$ is segregated at the grain boundaries of nonmagnetic CoCr crystal grains. In the miniaturization promoting layer, the CoCr crystal structure is, for example, an hcp crystal structure. The miniaturization promoting layer may partly contain CoCr with a bcc crystal structure. The content of $SiO_2$ in the miniaturization promoting layer is, for example, about 12 at % (e.g. 10 to 16 at %). The thickness of the miniaturization promoting layer is, for example, about 2 nm. The granular layer 20 of the perpendicular magnetic recording layer 30 is formed on the miniaturization promoting layer.

The granular layer 20 is a layer with a granular structure in which an oxide is segregated at the grain boundaries of miniaturized crystal grains, and is one example of a main recording layer. In this example, the granular layer 20 is a CoCrPt—$SiO_2$ layer and contains magnetic grains and a nonmagnetic substance magnetically isolating the magnetic grains at the grain boundaries of the magnetic grains. The thickness of the granular layer 20 is, for example, 20 nm or less, preferably 8 to 16 nm, and more preferably 7 to 15 nm (e.g. about 9 nm).

The magnetic grains of the granular layer 20 are crystal grains that exhibit perpendicular magnetic anisotropy, and are adapted to reverse their magnetic moments according to a signal recorded in the granular layer 20. In this example, these magnetic grains are CoCrPt with an hcp crystal structure. The size (diameter) of the magnetic grains is, for example, 5 to 20 nm and preferably 8 to 15 nm. The width of the grain boundaries of the magnetic grains is 2 nm or more, for example, 2 to 20 nm and preferably 4 to 15 nm. The width of the grain boundaries of the magnetic grains represents, for example, an average value of the widths of the grain boundaries of the magnetic grains in the granular layer 20.

The nonmagnetic substance contained in the granular layer 20 is a nonmagnetic oxide segregated at the grain boundaries of the magnetic grains. In this example, this nonmagnetic substance is, for example, silicon oxide ($SiO_2$). As the nonmagnetic substance, use may be made of, for example, titanium oxide ($TiO_2$) instead of $SiO_2$. The content of $SiO_2$ or the like in the granular layer 20 is, for example, 10 to 16 at % and preferably 12 to 14%.

When, for example, the content of $SiO_2$ or the like is set to 6 at % or more, the SN ratio can be improved by miniaturization of the nonmagnetic substance, but there is also a possibility of the occurrence of degradation in coercive force Hc, perpendicular magnetic anisotropy, or the like of the granular layer 20 alone. Further, by this, the thermal stability of the granular layer 20 alone is considered to be reduced. However, in this example, the continuous film layer 24 is formed over the granular layer 20. Therefore, even if the content of $SiO_2$ or the like in the granular layer 20 is increased, it is possible to prevent the occurrence of these problems.

The coupling control layer 22 is a layer for controlling the strength of magnetic coupling between the granular layer 20 and the continuous film layer 24. In this example, the coupling control layer 22 is, for example, a Pd layer with an fcc crystal structure. The thickness of the coupling control layer 22 is, for example, 2 nm or less and is, for example, 0.5 to 1.5 nm and preferably 0.7 to 1.0 nm (e.g. about 0.8 nm). The coupling control layer 22 may alternatively be a Pt layer.

The continuous film layer 24 is a layer in which exchange coupling continuously extends in a direction parallel to the main surface of the substrate 12. The continuous film layer 24 is one example of an auxiliary magnetic layer and contains magnetic grains that exhibit perpendicular magnetic anisotropy. These magnetic grains are magnetically exchange-coupled to the magnetic grains of the granular layer 20 in a direction perpendicular to the main surface of the substrate 12.

The width of the grain boundaries of these magnetic grains is smaller than that of the grain boundaries of the magnetic grains of the granular layer 20 and, for example, 1 nm or less and is, for example, 0.1 to 1 nm and preferably 0.3 to 0.8 nm. By this, in the direction parallel to the main surface of the substrate 12, the magnetic grains of the continuous film layer 24 are exchange-coupled to each other with a coupling force greater than that between the magnetic grains of the granular layer 20. Therefore, with this configuration, for example, by pinning (Pinning) magnetization of the continuous film layer 24 using magnetization of the granular layer 20, it is possible to improve the thermal stability of recorded signals. The thickness of the continuous film layer 24 is, for example, 1 to 8 nm, preferably 3 to 6 nm, and more preferably 4 to 5 nm.

The ratio A/B between the thickness A of the granular layer 20 and the thickness B of the continuous film layer 24 is, for example, 2 to 5 and preferably 3 to 4. With this configuration, it is possible to exhibit suitable perpendicular magnetic recording characteristics by the exchange coupling. A magnetic anisotropy constant (maximum anisotropy energy) Ku of the magnetic grains of the continuous film layer 24 is, for example, preferably greater than that of the soft magnetic substance. With this configuration, it is possible to reduce the width of domain walls formed in the continuous film layer 24. The magnetic anisotropy constant Ku of the continuous film layer 24 may be greater than that of the granular layer 20. A coercive force Hc of a material forming the continuous film layer 24 may be, for example, smaller than that of the material forming the magnetic grains of the granular layer 20.

In this example, the continuous film layer 24 is one example of a magnetic layer that exhibits perpendicular magnetic anisotropy due to interface magnetic anisotropy, and is a multilayer film in which CoCr layers 106 and Pd layers 108 are alternately laminated by about three layers (e.g. two or three layers) for each. The CoCr layer 106 is a layer containing magnetic grains of CoCr. The thickness of the CoCr layer 106 is, for example, about 0.35 nm. When the CoCr layer 106 is extremely thin as described above, the magnetic grains of CoCr are not required to have a crystal structure. The CoCr layer 106 may contain, for example, crystal grains of CoCr with an hpc crystal structure. The Pd layer 108 is a nonmagnetic Pd layer with an fcc crystal structure. The thickness of the Pd layer 108 is, for example, about 0.8 nm. When configured in this manner, interface magnetic anisotropy is generated at the interface between the CoCr layer 106 and the Pd layer 108. By stacking the layers 106 and 108, for example, by three layers for each, it is possible to obtain necessary perpendicular magnetic anisotropy. This makes it possible to reduce the thickness of the continuous film layer 24 as compared with using, for example, a single-layer continuous film layer 24.

The continuous film layer 24 may have, for example, a Pt layer instead of the Pd layer 108. Further, the continuous film layer 24 may have a CoB layer instead of the CoCr layer 106. The continuous film layer 24 may alternatively be a multi-layer film [CoX/Pd or Pt]n in which layers of a Co compound and Pd layers or Pt layers are alternately laminated by n layers for each. Alternatively, the continuous film layer 24 may be, for example, a single-layer film with high Pt content. The continuous film layer 24 may alternatively be a single-layer film of, for example, CoCrPt, CoPt, CoPd, FePt, $CoPt_3$, $CoPd_3$, amorphous TbFeCoCr, $SmCo_5$, $Nd_2Fe_{14}B$, $Co_{20}Pt_{80}$, or the like.

In this example, isolation regions 202 are formed in part of the continuous film layer 24. The isolation regions 202 are regions for magnetically isolating a plurality of recording regions from each other, where magnetic signals are to be respectively recorded, in the perpendicular magnetic recording layer 30. In this example, the isolation regions 202 are soft magnetic regions and are formed by, for example, changing the crystal structure of the continuous film layer 24 being the multilayer film by ion-beam irradiation. In the continuous film layer 24, regions where the isolation regions 202 are not formed serve as hard magnetic portions 204 that exhibit perpendicular magnetic anisotropy. Details of the isolation regions 202 and the hard magnetic portions 204 will be described later.

The protective layer 26 and the lubricating layer 28 are further formed over the continuous film layer 24. The protective layer 26 is a layer for protecting the perpendicular magnetic recording layer 30 from an impact of the head. The protective layer 26 is, for example, a carbon-based film with a diamond-like structure. The lubricating layer 28 is a layer for increasing the lubricity between the head and the magnetic recording medium 10. The lubricating layer 28 is, for example, a film of PFPE (perfluoropolyether) formed by a dip coating method.

In the manufacturing processes of the magnetic recording medium 10, the respective layers from the adhesive layer 14 to the continuous film layer 24 are each preferably formed by a sputtering method. Particularly, a DC magnetron sputtering method is preferable because uniform film formation is enabled. On the other hand, the protective layer 26 is preferably formed by a CVD method.

When forming the CoCr layers 106 and the Pd layers 108 of the continuous film layer 24, it is preferable to use Kr as a sputtering gas. With this configuration, the interface magnetic anisotropy can be more appropriately generated by forming the clean interfaces between the CoCr layers 106 and the Pd layers 108. The CoCr layers 106 and the Pd layers 108 may be formed by a CVD method.

Hereinbelow, the method of forming the isolation regions 202 and the hard magnetic portions 204 of the continuous film layer 24 will be described in further detail. In this example, the isolation regions 202 and the hard magnetic portions 204 are formed by a recording layer forming process and an ion-beam irradiation process. The recording layer forming process is a process of forming the granular layer 20, the coupling control layer 22, and the continuous film layer 24 over the underlayer 18 and forms the multilayer film of the CoCr layers 106 and the Pd layers 108 as the continuous film layer 24.

The ion-beam irradiation process is a process of irradiating an ion beam on part of the continuous film layer 24 and forms the isolation regions 202 by soft-magnetizing regions irradiated with the ion beam. Regions not irradiated with the ion beam are left remaining as the hard magnetic portions 204. By this, the ion-beam irradiation process forms the isolation regions 202 and the hard magnetic portions 204 in the continuous film layer 24.

FIG. 1 (b) shows a first example of an ion-beam irradiation method. In this example, the ion-beam irradiation process uses a silicon stencil mask 40 to set regions, to be irradiated with an ion beam 42, on the continuous film layer 24. Then, the isolation regions 202 are formed by irradiating the ion beam 42 on those regions. With this configuration, it is possible to accurately set the regions to be irradiated with the ion beam 42. Therefore, according to this example, the isolation regions 202 can be properly formed with high accuracy.

Herein, the ion-beam irradiation process forms the isolation regions 202, being soft magnetic, in the regions irradiated with the ion beam 42 by, for example, changing the crystal structure of the continuous film layer 24 by the energy of the ion beam 42. In this case, the ion-beam irradiation process may form the isolation regions 202 so that the entire perpendicular magnetic recording layer 30 combining the granular layer 20, the coupling control layer 22, and the continuous film layer 24 exhibits the soft magnetic properties. The ion-beam irradiation process preferably forms the isolation regions 202 having an axis of easy magnetization in an in-plane direction parallel to the main surface of the substrate 12. With this configuration, it is possible to more appropriately block a recording magnetic field extending in the direction parallel to the main surface of the substrate 12 by the isolation regions 202.

In this example, the continuous film layer 24 is the multilayer film of the CoCr layers 106 and the Pd layers 108. This multilayer film exhibits the perpendicular magnetic anisotropy due to the interface magnetic anisotropy. The ion-beam irradiation process forms the isolation regions 202 by irradiating the ion beam 42 on this multilayer film to form an alloy of metals contained in the CoB layers 106 and the Pd layers 108 of the multilayer film, respectively. This makes the interface state of the isolation regions 202 different from that of the hard magnetic portions 204 being the regions not irradiated with the ion beam so that the isolation regions 202 become soft magnetic regions that exhibit substantially no perpendicular magnetic anisotropy due to interface magnetic anisotropy. Therefore, according to this example, the isolation regions 202 can be properly formed by ion-beam irradiation. Further, it is possible to form the isolation regions 202 substantially only in the continuous film layer 24 among the respective layers included in the perpendicular magnetic recording layer 30.

Herein, in this example, the ion-beam irradiation process forms the isolation regions 202 by changing the interface state of the continuous film layer 24 by ion-beam irradiation. This change in interface state occurs with a smaller ion beam dose (Dose) as compared with, for example, the case of changing the state of the continuous film layer 24 over the entire thickness thereof. Therefore, according to this example, the isolation regions 202 can be properly formed with a small ion beam dose. Further, in this case, for example, since it becomes possible to narrow a range affected by the ion beam, ion-beam irradiation can be performed with higher accuracy. This makes it possible to accurately form the isolation regions 202.

Further, the isolation regions 202, being soft magnetic, can be formed with a smaller ion beam dose as compared with, for example, nonmagnetic regions. Therefore, according to this example, the isolation regions 202 can be formed with a smaller ion beam dose. This makes it possible to form the isolation regions 202 with higher accuracy.

FIG. 2 is a top view of the continuous film layer 24 showing positions of the isolation regions 202 and the hard magnetic portions 204. In the figure, white portions and black portions in the hard magnetic portions 204 represent the difference in magnetization direction due to the difference in information recorded in respective bits on tracks. In this example, the ion-beam irradiation process irradiates an ion beam on guard band regions each being a gap region between the adjacent tracks. Therefore, the isolation regions 202 are each formed in the guard band region. Regions corresponding to the tracks become the hard magnetic portions 204. In the granular layer 20, the tracks are defined by magnetic influence received from the continuous film layer 24.

With this configuration, the tracks are magnetically isolated from each other by the isolation regions 202. Therefore, it is possible to make the magnetic recording medium 10 (see FIG. 1) properly function as a DTR medium. Further, for example, since the track edge noise is reduced by this, it is possible to reduce the track width (Erase width) and thus to improve the track density.

Further, when configured in this manner, the isolation regions 202 being the soft magnetic regions prevent a magnetic field from extending in the direction parallel to the main surface of the substrate 12 (see FIG. 1) between the tracks. Therefore, with this configuration, when recording a magnetic signal on the track, it is possible to block a recording magnetic field extending toward the outside of the track, thereby making the boundaries of the recording magnetic field sharp. This makes it possible to properly prevent the influence of the recording magnetic field from being exerted on the adjacent tracks. Therefore, according to this example, magnetic isolation between the tracks can be more appropriately carried out.

The track width L1 of the magnetic recording medium 10 is, for example, 100 to 200 nm and preferably 135 to 165 nm. The track interval (track pitch) L2 being a distance from the center of the track to the center of the adjacent track is, for example, 150 to 250 nm and preferably 180 to 220 nm. The width L3 of each isolation region 202 in a track width direction is, for example, 30 to 70 nm and preferably 40 to 60 nm. For example, when it is not necessary to block extension of a recording magnetic field by soft magnetic regions because of the track interval being large or the like, nonmagnetic regions may be formed as isolation regions 202.

Isolation regions 202 may further be formed in regions each located between bits to be recorded on the tracks. With this configuration, it is possible to make the magnetic recording medium 10 function as a patterned (bit-patterned) medium.

FIGS. 3 and 4 are graphs showing the states of changes in magnetic properties by ion-beam irradiation on multilayer films each being the same as the continuous film layer 24. Table 1 shows ion-beam irradiation conditions corresponding to respective magnetic properties shown in the graphs of FIGS. 3 and 4 and coercive forces Hc and squareness ratios S in the respective magnetic properties.

TABLE 1

| sample | species | dose(/cm$^2$) | energy(keV) | Hc | S |
|---|---|---|---|---|---|
| D1 | Ar$^+$ | 5.0E+15 | 30 | 38 | 0.07 |
| D3 | Ar$^+$ | 1.0E+15 | 30 | 230 | 1.00 |
| D5 | Ar$^+$ | 5.0E+14 | 30 | 527 | 1.00 |
| D7 | Ar$^+$ | 5.0E+15 | 20 | 57 | 0.12 |
| D9 | Ar$^+$ | 1.0E+15 | 20 | 376 | 1.00 |
| D11 | Ar$^+$ | 5.0E+14 | 20 | 911 | 1.00 |
| D13 | Ar$^+$ | 5.0E+15 | 10 | 151 | 0.21 |

TABLE 1-continued

| sample | species | dose(/cm$^2$) | energy(keV) | Hc | S |
|---|---|---|---|---|---|
| D15 | Ar$^+$ | 1.0E+15 | 10 | 1585 | 1.00 |
| D17 | Ar$^+$ | 5.0E+14 | 10 | 2337 | 1.00 |
| D19 | Ar$^+$ | 5.0E+15 | 5 | 1028 | 0.86 |
| D21 | Ar$^+$ | 1.0E+15 | 5 | 2488 | 1.00 |
| D23 | Ar$^+$ | 5.0E+14 | 5 | 2993 | 1.00 |
| D25 | reference(no) | 0 | 0 | 4275 | 1.00 |

As seen from Table 1 and FIGS. 3 and 4, when the ion beam dose (Dose) is set to $1\times10^{15}$ to $5\times10^{15}$/cm$^2$, the coercive force Hc becomes small. This represents that a region irradiated with an ion beam is soft-magnetized. From this result, it is seen that if regions to be irradiated with an ion beam are set by, for example, the method described using FIG. 1 (b) or the like, it is possible to properly form isolation regions 202 and hard magnetic portions 204 in a continuous film layer 24. When the ion beam dose (Dose) is set to $5\times10^{15}$/cm$^2$, the squareness ratio S becomes small. This represents that a soft magnetic region having an axis of easy magnetization in an in-plane direction parallel to a main surface of a substrate 12 is formed by ion-beam irradiation.

The ion beam dose (Dose) may be greater than $5\times10^{14}$/cm$^2$. For example, the ion beam dose (Dose) may be $1\times10^{14}$ to $5\times10^{16}$/cm$^2$. When forming the soft magnetic region having the axis of easy magnetization in the in-plane direction parallel to the main surface of the substrate 12, the ion beam dose (Dose) is preferably set to, for example, $5\times10^{15}$ to $5\times10^{16}$/cm$^2$. If the ion beam dose (Dose) is too small, a region irradiated with an ion beam does not become soft magnetic. If it is too large, the process takes time, which is thus not efficient. Further, there is also a possibility that a region irradiated with an ion beam is etched.

The ion irradiation energy is preferably set to 5 to 30 KeV and more preferably 10 to 30 KeV. If the energy is too small, the soft magnetic region cannot be properly formed. If the energy is large, a nonmagnetic isolation region 202 is formed in a region irradiated with an ion beam. If the energy is too large, there is a possibility that an ion beam passes through the layer and further exerts an influence upon a lower layer.

The ion-beam irradiation process may irradiate, for example, an ion beam of phosphorus ions (P$^+$) or the like. Alternatively, use may be made of an ion beam of He, B, C, N, Ne, Ar, Cr, Co, Kr, Xe, Pt, or the like.

FIG. 5 shows a second example of an ion-beam irradiation method in the ion-beam irradiation process. In this example, the ion-beam irradiation process uses a resist mask 44 formed by the nanoimprint technique.

In this ion-beam irradiation process, as shown in FIG. 5 (a), the resist mask 44 is formed by, for example, using a nanoimprint mold 46 to emboss a resist film coated on a continuous film layer 24. Then, as shown in FIG. 5 (b), irradiation of an ion beam 42 is carried out using the resist mask 44 as a mask, thereby forming isolation regions 202 in the continuous film layer 24.

After forming the isolation regions 202, as shown in FIG. 5 (c), the resist mask 44 is removed by, for example, ashing and cleaning. Also with this configuration, the isolation regions 202 can be properly formed. After the ion-beam irradiation process, for example, as shown in FIG. 5 (d), a carbon-overcoat protective layer 26 is formed on the continuous film layer 24.

Embodiment 2

Hereinbelow, another embodiment according to this second invention will be described with reference to FIG. 7.

In this example, a magnetic recording medium 10 comprises a substrate 12, an adhesive layer 14, a soft magnetic layer 16, an underlayer 18, a perpendicular magnetic recording layer 30, a protective layer 26, and a lubricating layer 28 in this order. The perpendicular magnetic recording layer 30 comprises a granular layer 20 and a magnetically coupling layer 24' (not continuous layers but a single layer) stacked in this order.

In this example, the substrate 12, the adhesive layer 14, the soft magnetic layer 16, the underlayer 18, the protective layer 26, and the lubricating layer 28 are the same as those in the above-mentioned embodiment 1 and thus description thereof is omitted.

In the embodiment 2, the magnetically coupling layer forms a thin film, which exhibits perpendicular magnetic anisotropy, on the magnetic recording layer with a granular structure and is magnetically coupled to the perpendicular magnetic recording layer by exchange interaction between the magnetic recording layer and the magnetically coupling layer that is magnetically coupled to magnetic grains in the magnetic recording layer.

As an example of the magnetically coupling layer, there can be cited an alloy-based material such as CoCr, CoCrTa, CoCrPt, CoCrPtTa, or CoCrPtB.

The magnetically coupling layer preferably contains at least CoCrPt and, if it mainly contains CoCrPt, it is possible to add high heat resistance in addition to high-density recordability and low noise of the granular layer.

The magnetically coupling layer has a non-granular structure containing no metal oxide or nitride at the grain boundaries (nonmagnetic grain boundaries) of magnetic grains.

The thickness of the magnetically coupling layer is, for example, 1 to 10 nm and preferably 2 to 9 nm.

The thickness of the magnetically coupling layer is preferably half or less of that of the granular layer and more preferably one-third or less thereof. The lower limit of the thickness is greater than zero and is preferably set to a value that enables the magnetically coupling layer to exhibit its function.

In the embodiment 2, the granular layer is preferably a CoCrPt—SiO$_2$—TiO$_2$ layer. Further, the thickness of the magnetically coupling layer is preferably set thinner than conventional. The reasons therefor will be described hereinbelow.

When the granular layer is a CoCrPt—SiO$_2$ layer, a high SN ratio cannot be obtained unless the thickness of the magnetically coupling layer is set to a certain high value. However, as the thickness of the magnetically coupling layer increases, the coercive force Hc decreases. Further, if the thickness of the magnetically coupling layer is large, since it is necessary to change the properties over the entire thickness, the change in properties (e.g. soft magnetization) by ion-beam irradiation is hard to occur.

In contrast, when the granular layer is the CoCrPt—SiO$_2$—TiO$_2$ layer, the grain boundaries of magnetic grains in the granular layer become clearer as compared with the case where the granular layer is the CoCrPt—SiO$_2$ layer, and thus the coercive force Hc becomes higher as compared with the case where the granular layer is the CoCrPt—SiO$_2$ layer. Therefore, even if the thickness of the magnetically coupling layer is set relatively thin as compared with conventional values, a relatively high coercive force Hc can be obtained.

If the thickness of the magnetically coupling layer can be made thin, it is possible to properly carry out magnetic isolation between recording regions in addition to the fact that the change in properties (e.g. soft magnetization) by ion-beam irradiation is facilitated. Therefore, for example, it is possible to make the magnetic recording medium properly function as a DTR medium or a patterned medium.

In this example, isolation regions 202 are formed in part of the magnetically coupling layer 24'. The isolation regions 202 are regions for magnetically isolating a plurality of recording regions from each other, where magnetic signals are to be respectively recorded, in the perpendicular magnetic recording layer 30. In this example, the isolation regions 202 are soft magnetic regions and are formed by, for example, changing the crystal structure of the magnetically coupling layer 24' being a single-layer film by ion-beam irradiation. In the magnetically coupling layer 24', regions where the isolation regions 202 are not formed serve as hard magnetic portions 204 that exhibit perpendicular magnetic anisotropy.

Hereinbelow, the method of forming the isolation regions 202 and the hard magnetic portions 204 of the magnetically coupling layer 24' will be described in further detail. In this example, the isolation regions 202 and the hard magnetic portions 204 are formed by a recording layer forming process and an ion-beam irradiation process. The recording layer forming process is a process of forming the granular layer 20 and the magnetically coupling layer 24' over the underlayer 18 and forms, as the magnetically coupling layer 24', a single-layer film being a CoCrPt layer or a CoCrPtB layer.

The ion-beam irradiation process is a process of irradiating an ion beam on part of the magnetically coupling layer 24' and forms the isolation regions 202 by soft-magnetizing regions irradiated with the ion beam. Regions not irradiated with the ion beam are left remaining as the hard magnetic portions 204. By this, the ion-beam irradiation process forms the isolation regions 202 and the hard magnetic portions 204 in the magnetically coupling layer 24'.

FIG. 1(b) shows a first example of an ion-beam irradiation method. In this example, the ion-beam irradiation process uses a silicon stencil mask 40 to set regions, to be irradiated with an ion beam 42, on the magnetically coupling layer 24. Then, the isolation regions 202 are formed by irradiating the ion beam 42 on those regions. With this configuration, it is possible to accurately set the regions to be irradiated with the ion beam 42. Therefore, according to this example, the isolation regions 202 can be properly formed with high accuracy.

Herein, the ion-beam irradiation process forms the isolation regions 202, being soft magnetic, in the regions irradiated with the ion beam 42 by, for example, changing the crystal structure of the magnetically coupling layer 24 by the energy of the ion beam 42. In this case, the ion-beam irradiation process may form the isolation regions 202 so that the entire perpendicular magnetic recording layer 30 combining the granular layer 20 and the magnetically coupling layer 24 exhibits the soft magnetic properties. The ion-beam irradiation process preferably forms the isolation regions 202 having an axis of easy magnetization in an in-plane direction parallel to a main surface of the substrate 12. With this configuration, it is possible to more appropriately block a recording magnetic field extending in a direction parallel to the main surface of the substrate 12 by the isolation regions 202.

In this example, the magnetically coupling layer 24' is the single-layer film being the CoCrPt layer or the CoCrPtB layer. This single-layer film exhibits perpendicular magnetic anisotropy due to interface magnetic anisotropy. The ion-beam irradiation process forms the isolation regions 202 by irradiating the ion beam 42 on this single-layer film to form an alloy of metals contained in the single-layer film. This makes the interface state of the isolation regions 202 different from that of the hard magnetic portions 204 being the regions not irradiated with the ion beam so that the isolation regions 202 become soft magnetic regions that exhibit substantially no perpendicular magnetic anisotropy due to interface magnetic anisotropy. Therefore, according to this example, the isolation regions 202 can be properly formed by ion-beam irradiation. Further, it is possible to form the isolation regions 202 substantially only in the magnetically coupling layer 24' of the respective layers included in the perpendicular magnetic recording layer 30.

Herein, in this example, the ion-beam irradiation process forms the isolation regions 202 by changing the interface state of the magnetically coupling layer 24' by ion-beam irradiation. This change in interface state occurs with a smaller ion beam dose (Dose) as compared with, for example, the case of changing the state of the magnetically coupling layer 24' over the entire thickness thereof. Therefore, according to this example, the isolation regions 202 can be properly formed with a small ion beam dose. Further, in this case, for example, since it becomes possible to narrow a range affected by the ion beam, ion-beam irradiation can be performed with higher accuracy. This makes it possible to accurately form the isolation regions 202.

Further, the isolation regions 202, being soft magnetic, can be formed with a smaller ion beam dose as compared with, for example, nonmagnetic regions. Therefore, according to this example, the isolation regions 202 can be formed with a smaller ion beam dose. This makes it possible to form the isolation regions 202 with higher accuracy.

FIG. 5 shows a second example of an ion-beam irradiation method in the ion-beam irradiation process. In this example, the ion-beam irradiation process uses a resist mask 44 formed by the nanoimprint technique.

In this ion-beam irradiation process, as shown in FIG. 5(a), the resist mask 44 is formed by, for example, using a nanoimprint mold 46 to emboss a resist film coated on a magnetically coupling layer 24. Then, as shown in FIG. 5(b), irradiation of an ion beam 42 is carried out using the resist mask 44 as a mask, thereby forming isolation regions 202 in the magnetically coupling layer 24.

Hereinbelow, this second invention will be described in further detail using Examples.

Example 1

Using an evacuated film forming apparatus, an adhesive layer 14 and a soft magnetic layer 16 are formed in sequence on an aluminosilicate glass substrate 12 in an Ar atmosphere by a DC magnetron sputtering method. In this event, the adhesive layer 14 is formed using a CrTi target so as to be a CrTi layer with a thickness of 10 nm. The soft magnetic layer 16 is formed using a CoTaZr target so as to be an amorphous CoTaZr layer with a total thickness of 50 nm. For controlling magnetic domains, the soft magnetic layer 16 has a two-layer structure with a Ru layer with a thickness of 0.9 nm interposed therebetween.

After forming the soft magnetic layer 16, continuously, a Ta layer (thickness 3 nm) serving as a first orientation control layer and Ru layers (thickness 20 nm) serving as a second orientation control layer and an isolation promoting layer are formed as an underlayer 18 in the Ar atmosphere by the DC magnetron sputtering method. Then, a granular layer 20 having a thickness of 9 nm and containing magnetic grains with an hcp crystal structure is formed using a hard magnetic target made of $CoCrPt$—$SiO_2$.

Further, using a low-pressure Ar gas as a sputtering gas, a Pd layer (thickness 0.8 nm) is formed as a coupling control layer 22 and $[CoCr/Pd]_3$ layers are formed as a continuous film layer 24. The thickness of each CoCr layer is set to 0.4 nm and the thickness of each Pd layer is set to 0.9 nm. The thickness of the continuous film layer 24 in which the CoCr layers and the Pd layers are alternately laminated by three layers for each is 4 nm (3.9 to 4 nm).

An ion beam 42 of argon ions (Ar$^+$) accelerated with an energy of 30 KeV is irradiated on a medium formed with the layers up to the continuous film layer 24, using a stencil mask 40 as described using FIG. 1(b), thereby forming soft magnetic isolation regions 202 in regions between tracks. In this ion-beam irradiation, the ion beam dose is set to $5\times10^{15}/cm^2$. The width, in a track width direction, of each formed isolation region 202 is 50 nm. The track width is 150 nm and the track interval is 200 nm.

Then, using a mixed gas containing Ar and 30% hydrogen and using a carbon target as a sputtering target, a protective layer 26 made of hydrogenated carbon (hydrogenated carbon) is formed. Since the film hardness is improved by the use of the hydrogenated carbon, it is possible to properly protect the perpendicular magnetic recording layer 30 against an impact from a head. Thereafter, a lubricating layer 28 made of PFPE (perfluoropolyether) is formed by a dip coating method. The thickness of the lubricating layer 28 is 1 nm. In this manner, a magnetic recording medium 10 according to Example 1 is fabricated.

In the magnetic recording medium 10 according to Example 1, high thermal stability can be obtained by the CGC medium structure. Further, by the formation of the isolation regions 202, it is possible to make the magnetic recording medium 10 function as a DTR medium. Further, by forming the isolation regions 202 as soft magnetic regions, when recording a magnetic signal on a track, it is possible to block a recording magnetic field extending toward the outside of the track, thereby preventing the recording magnetic field from extending outside the track. Therefore, according to Example 1, the track edge noise can be properly reduced. For example, in the magnetic recording medium 10 according to Example 1, the SN ratio is improved by about 1.0 to 3.5 dB as compared with the case where the isolation regions 202 are not formed.

In Example 1, the isolation regions 202 are soft magnetic regions. Further, the isolation regions 202 are formed by using the continuous film layer 24 of the [CoCr/Pd]$_3$ layers and changing the interface state thereof by ion-beam irradiation. Therefore, in Example 1, the isolation regions 202 can be formed with a small ion beam dose.

In this case, it becomes possible to narrow a range affected by an ion beam. The ion-beam irradiation can be performed with high accuracy. Therefore, according to Example 1, it is possible to accurately form the isolation regions 202. This makes it possible to improve the track density and thus to realize, for example, a recording density exceeding 200 Gbits per square inch and, further, for example, a recording density exceeding 500 Gbits per square inch.

Example 2

Using an evacuated film forming apparatus, an adhesive layer 14 and a soft magnetic layer 16 are formed in sequence on an aluminosilicate glass substrate 12 in an Ar atmosphere by a DC magnetron sputtering method (see FIG. 6). In this event, the adhesive layer 14 is formed using a CrTi target so as to be a CrTi layer with a thickness of 10 nm. The soft magnetic layer 16 is formed using a CoTaZr target so as to be an amorphous CoTaZr layer with a total thickness of 50 nm. For controlling magnetic domains, the soft magnetic layer 16 has a two-layer structure with a Ru layer with a thickness of 0.9 nm interposed therebetween.

After forming the soft magnetic layer 16, continuously, a Ta layer (thickness 3 nm) serving as a first orientation control layer and Ru layers (thickness 20 nm) serving as a second orientation control layer and an isolation promoting layer are formed as an underlayer 18 in the Ar atmosphere by the DC magnetron sputtering method. Then, a granular layer 20 having a thickness of 9 nm and containing magnetic grains 102 with an hcp crystal structure is formed using a hard magnetic target made of CoCrPt—SiO$_2$.

Further, using a CoCrPt target or a CoCrPtB target and using a low-pressure Ar gas as a sputtering gas, a CoCrPt layer (thickness 7 nm) or a CoCrPtB layer (thickness 7 nm) is formed as a magnetically coupling layer 24'.

An ion beam 42 of argon ions (Ar$^+$) accelerated with an energy of 30 KeV is irradiated on a medium formed with the layers up to the magnetically coupling layer 24', using a resist mask 44 formed by the nanoimprint technique as described using FIG. 5 (a), thereby forming isolation regions 202 in regions between tracks. In this ion-beam irradiation, the ion beam dose is set to $5\times10^{15}/cm^2$. The width, in a track width direction, of each formed isolation region 202 is 50 nm. The track width is 150 nm and the track interval is 200 nm.

Then, using a mixed gas containing Ar and 30% hydrogen and using a carbon target as a sputtering target, a protective layer 26 made of hydrogenated carbon (hydrogenated carbon) is formed. Since the film hardness is improved by the use of the hydrogenated carbon, it is possible to properly protect the perpendicular magnetic recording layer 30 against an impact from a head. Thereafter, a lubricating layer 28 made of PFPE (perfluoropolyether) is formed by a dip coating method. The thickness of the lubricating layer 28 is 1 nm. In this manner, a magnetic recording medium 10 according to Example 1 is fabricated.

(Evaluation)

It is possible to make the magnetic recording medium 10 according to Example 2 function as a DTR medium by the formation of the isolation regions 202. Further, by forming the isolation regions 202 as soft magnetic regions, when recording a magnetic signal on a track, it is possible to block a recording magnetic field extending toward the outside of the track, thereby preventing the recording magnetic field from extending outside the track. Therefore, according to Example 2, the track edge noise can be properly reduced. For example, in the magnetic recording medium 10 according to Example 2, the SN ratio is improved by about 1.0 to 3.5 dB as compared with the case where the isolation regions 202 are not formed.

In Example 1, the isolation regions 202 are soft magnetic regions. Further, the isolation regions 202 are formed by using the single-layer film 24' being the CoCrPt layer or the CoCrPtB layer and changing the state thereof by ion-beam irradiation.

In this case, it becomes possible to narrow a range affected by an ion beam. The ion-beam irradiation can be performed with high accuracy. Therefore, according to Example 2, it is possible to accurately form the isolation regions 202. This makes it possible to improve the track density and thus to realize, for example, a recording density exceeding 200 Gbits per square inch and, further, for example, a recording density exceeding 500 Gbits per square inch.

In the magnetic recording medium 10 according to Example 2, since the granular layer is a CoCrPt—SiO$_2$—TiO$_2$ layer, the grain boundaries of magnetic grains in the granular layer become clearer as compared with the case where the granular layer is a CoCrPt—SiO$_2$ layer, and thus the coercive force Hc becomes higher as compared with the case where the granular layer is the CoCrPt—SiO$_2$ layer. Therefore, even if the thickness of the magnetically coupling layer is set relatively thin as compared with conventional values, a relatively high coercive force Hc can be obtained.

If the thickness of the magnetically coupling layer can be made thin, it is possible to properly carry out magnetic isolation between recording regions in addition to the fact that the change in properties (e.g. soft magnetization) by ion-beam irradiation is facilitated. Therefore, it is possible to make the magnetic recording medium properly function as a DTR medium or a patterned medium.

In Example 2, the isolation regions 202 can be formed with a small ion beam dose.

While this invention has been described with reference to the embodiments, the technical scope of this invention is not limited to the scope of the description of the above-mentioned embodiments. It is obvious to a person skilled in the art that various changes or improvements can be added to the above-mentioned embodiments. It is clear from the description of claims that the modes added with such changes or improvements can also be included in the technical scope of this invention.

INDUSTRIAL APPLICABILITY

This invention is suitably applicable to, for example, a magnetic recording medium.

BRIEF DESCRIPTION OF THE DRAWINGS

FIG. 1 (a) shows one example of the structure of the magnetic recording medium 10. FIG. 1 (b) shows a first example of an ion-beam irradiation method in an ion-beam irradiation process.

FIG. 6 (a) shows the recording pattern in a granular medium being the magnetic recording medium according to Comparative Example 1. FIG. 6 (b) shows the recording pattern in a conventional type CGC medium being the magnetic recording medium according to Comparative Example 2.

DESCRIPTION OF SYMBOLS

Figure 1:
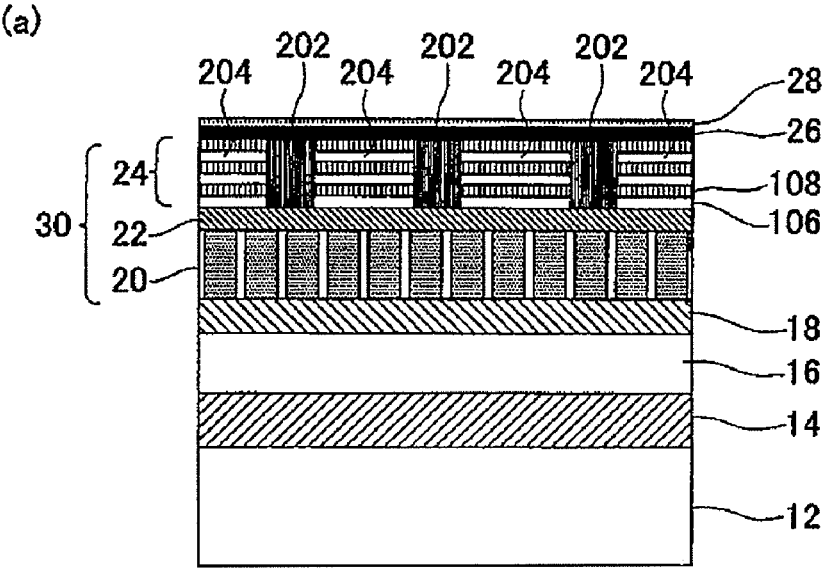
FIG. 1 is diagrams showing one example of a magnetic recording medium 10 according to one embodiment of this invention.
Figure 1:
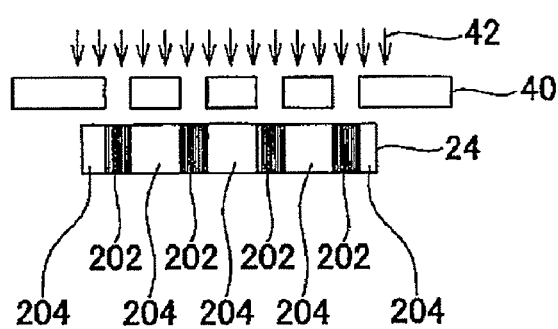
Figure 2:
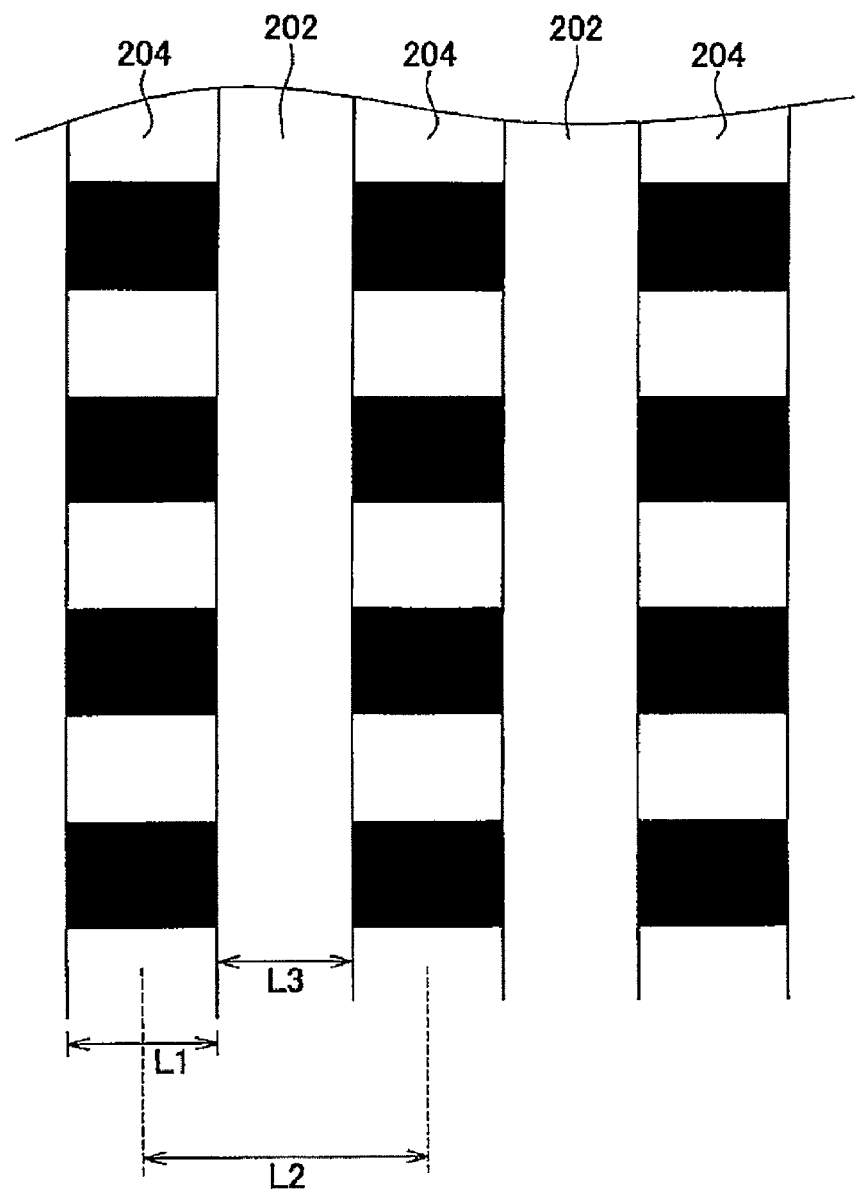
FIG. 2 is a top view of a continuous film layer 24 showing positions of magnetic field shield portions 202 and hard magnetic portions 204.
Figure 3:
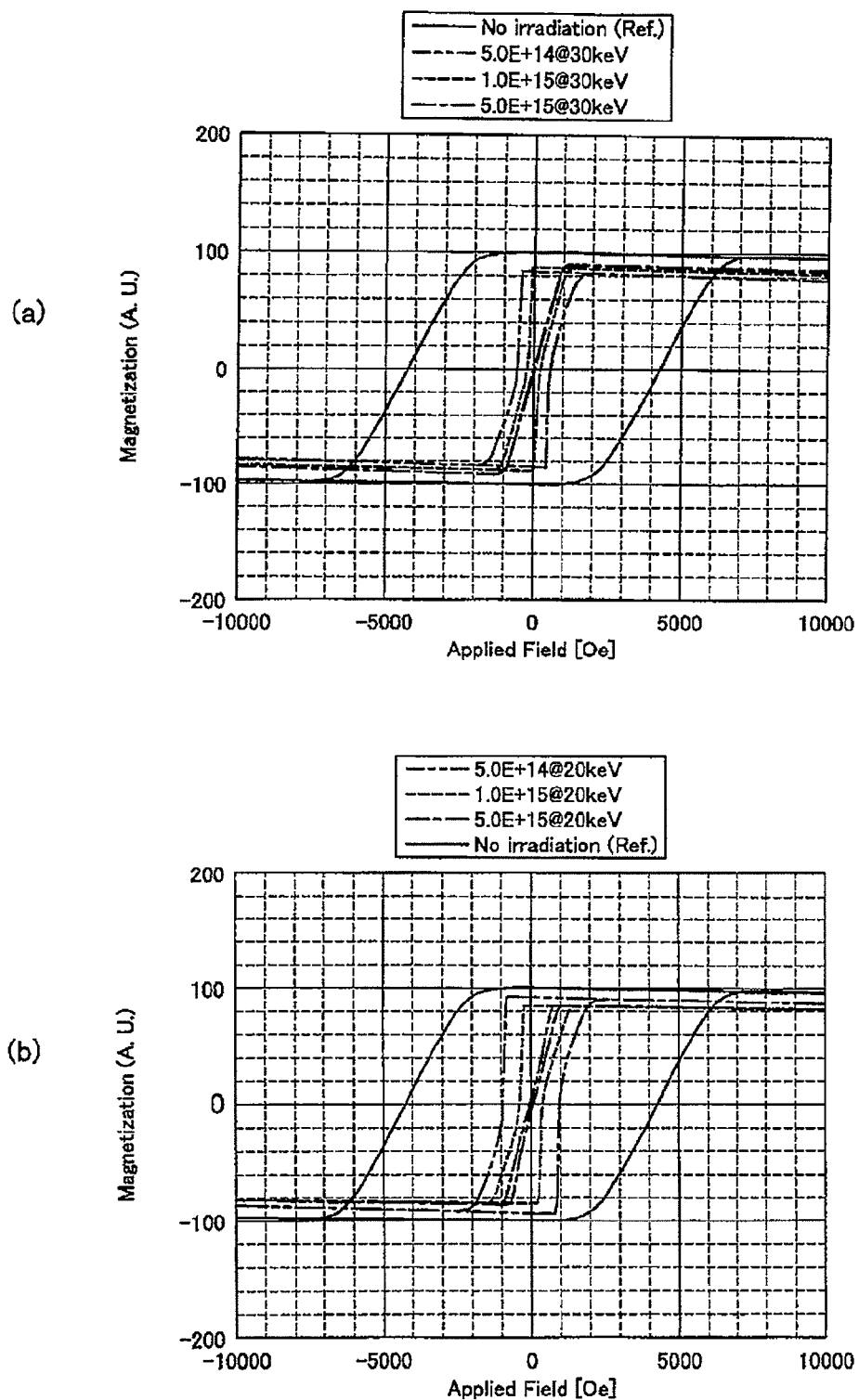
FIG. 3 is graphs showing the states of changes in magnetic properties by ion-beam irradiation.
Figure 4:
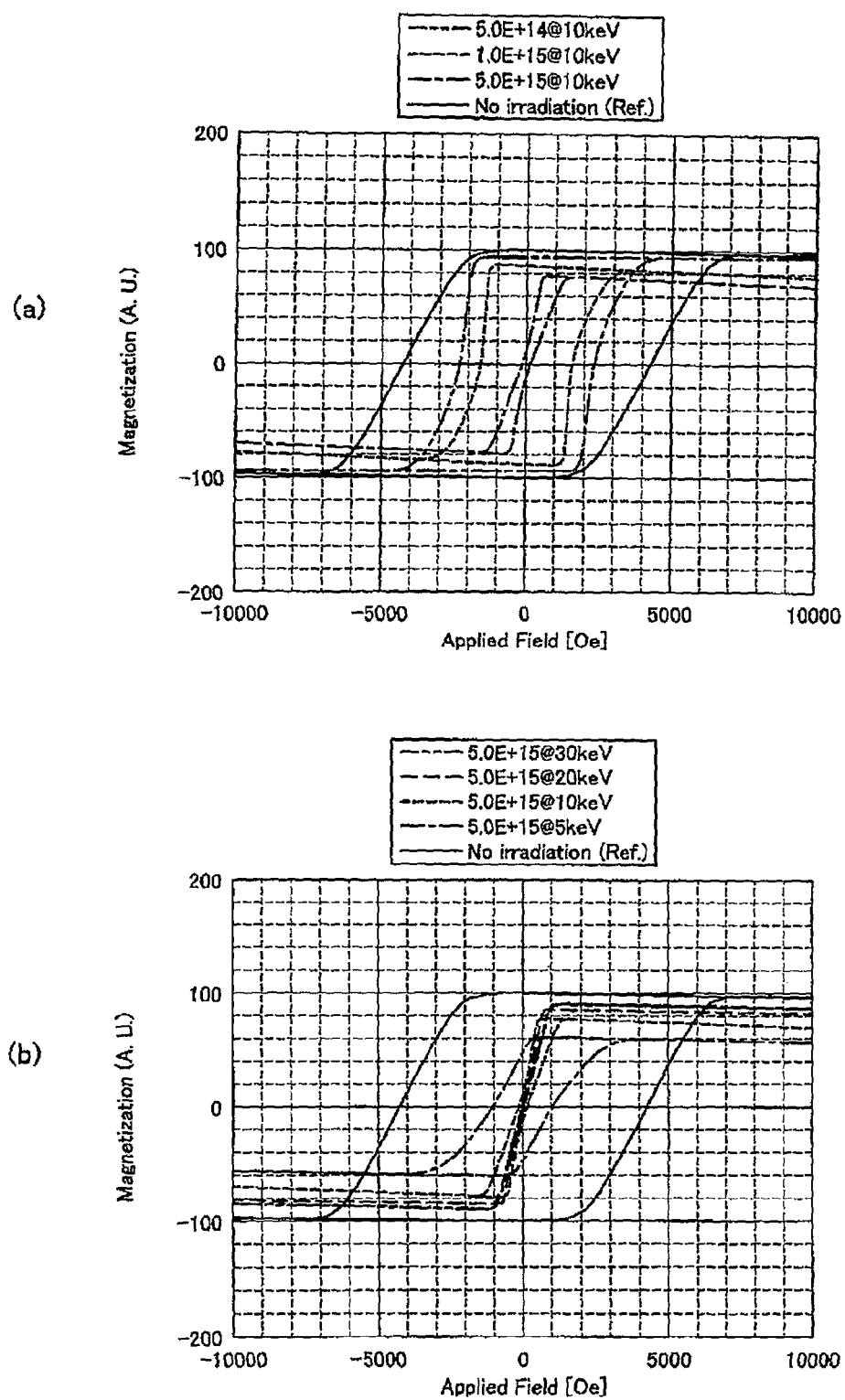
FIG. 4 is graphs showing the states of changes in magnetic properties by ion-beam irradiation.
Figure 5:
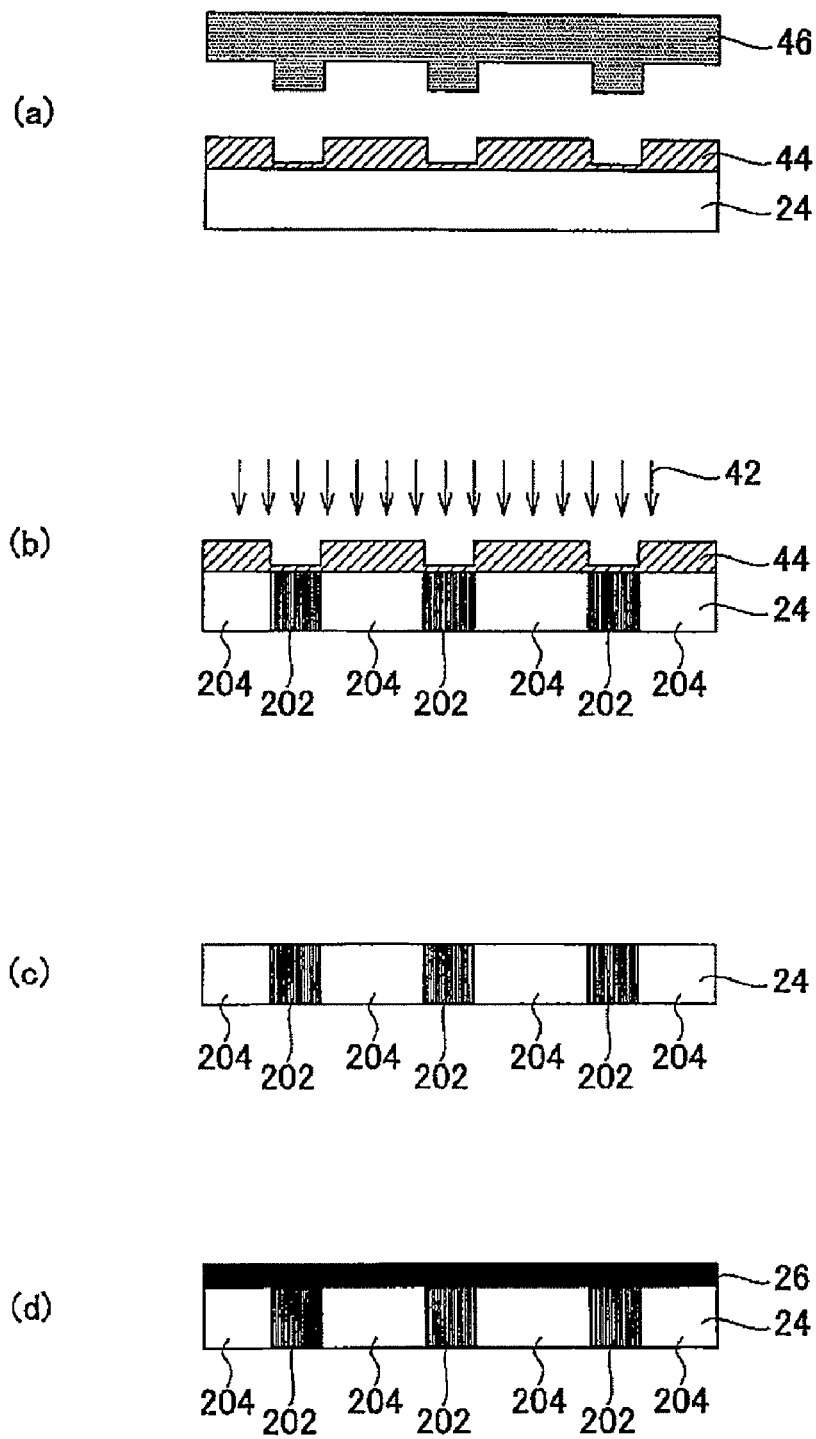
FIG. 5 is diagrams showing a second example of an ion-beam irradiation method in an ion-beam irradiation process.
Figure 6:
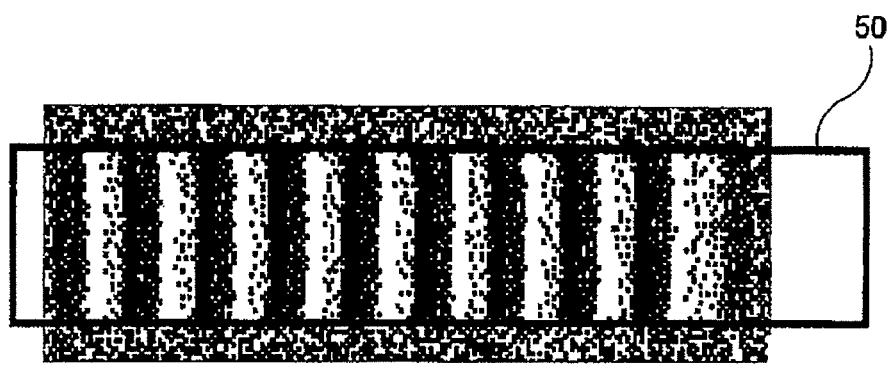
FIG. 6 shows the simulation results of recording patterns of information recorded in magnetic recording media according to Comparative Examples 1 and 2.
Figure 6:
Figure 7:
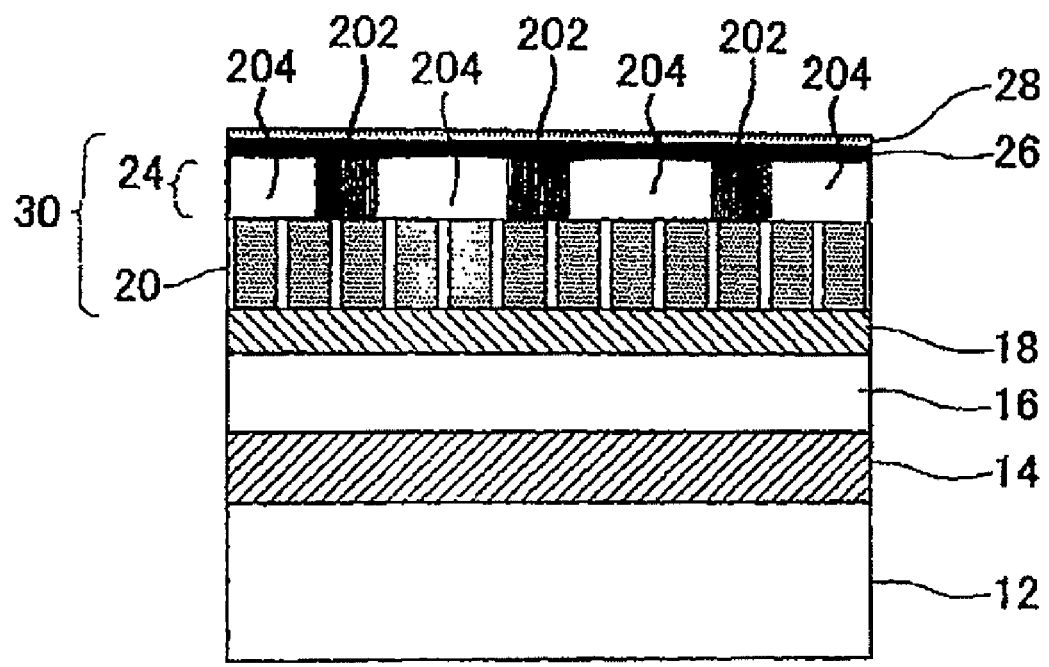
FIG. 7 is a diagram showing one example of a magnetic recording medium 10 according to another embodiment of this invention.

10 . . . magnetic recording medium, 12 . . . substrate, 14 . . . adhesive layer, 16 . . . soft magnetic layer, 18 . . . underlayer, 20 . . . granular layer (main recording layer), 22 . . . coupling control layer, 24 . . . continuous film layer (auxiliary magnetic layer), 24' . . . magnetically coupling layer, 26 . . . protective layer, 28 . . . lubricating layer, 30 . . . perpendicular magnetic recording layer, 40 . . . stencil mask, 42 . . . ion beam, 44 . . . resist mask, 46 . . . mold, 50 . . . rectangle, 106 . . . CoB layer, 108 . . . Pd layer, 202 . . . magnetic field shield portion or isolation region (soft magnetic region), 204 . . . hard magnetic portion

The invention claimed is:

1. A magnetic recording medium comprising a substrate and a magnetic layer formed over the substrate, wherein:
    the magnetic layer comprises a main recording layer for recording a magnetic signal and an auxiliary magnetic layer magnetically coupled to the main recording layer, and
    the auxiliary magnetic layer comprises;
    a plurality of hard magnetic portions respectively formed at positions corresponding to recording regions, where magnetic signals are to be recorded, in the main recording layer, and
    magnetic field shield portions formed between but without being disposed over the plurality of hard magnetic portions, respectively, wherein when magnetization curves are measured, the magnetization curve of each magnetic field shield portion has a slope greater than those of the hard magnetic portions in a region where an applied magnetic field is zero, and a residual magnetic polarization of each magnetic field shield portion is smaller than those of the hard magnetic portions.

2. A magnetic recording medium according to claim 1, wherein the magnetic field shield portions are soft magnetic.

3. A magnetic recording medium according to claim 2, wherein the magnetic field shield portions have an axis of easy magnetization in an in-plane direction parallel to a main surface of the substrate.

4. A magnetic recording medium according to claim 1, wherein:
    the magnetic recording medium is a magnetic recording medium for perpendicular magnetic recording,
    the hard magnetic portions of the auxiliary magnetic layer are magnetic regions that exhibit perpendicular magnetic anisotropy due to interface magnetic anisotropy, and
    the magnetic field shield portions of the auxiliary magnetic layer are magnetic regions of which an interface state is different from that of the hard magnetic portions and which exhibit substantially no perpendicular magnetic anisotropy due to interface magnetic anisotropy.

5. A magnetic recording medium according to claim 1, wherein:
    the main recording layer is a layer with a granular structure in which a nonmagnetic substance is segregated at grain boundaries of magnetic grains, and
    the hard magnetic portions of the auxiliary magnetic layer are each a multilayer film in which layers of a Co compound and Pd layers or Pt layers are alternately laminated.

6. A magnetic disk in which a magnetic recording layer with a granular structure in which nonmagnetic grain boundary portions are formed between magnetic grains continuously grown in a columnar shape and a magnetically coupling layer adjacent to the magnetic recording layer and magnetically continuous in an in-plane direction of a nonmagnetic substrate are stacked in this order over the substrate, the magnetic disk wherein:
    at least the magnetically coupling layer out of the magnetically coupling layer and the magnetic recording layer comprises;
    a plurality of hard magnetic portions respectively formed at positions corresponding to recording regions, where magnetic signals are to be recorded, in the magnetic recording layer, and
    magnetic field shield portions formed between but without being disposed over the adjacent hard magnetic portions, respectively, wherein when magnetization curves are measured, the magnetization curve of each magnetic field shield portion has a slope greater than those of the hard magnetic portions in a region where an applied magnetic field is zero, and a residual magnetic polarization of each magnetic field shield portion is smaller than those of said hard magnetic portions.

7. A magnetic disk according to claim 6, wherein the hard magnetic portions in the magnetically coupling layer are formed at the positions corresponding to the recording regions, where the magnetic signals are to be recorded, of the magnetic recording layer and the soft magnetic portions are formed in regions other than the positions.

8. A magnetic disk according to claim 6, wherein the soft magnetic portions and the hard magnetic portions are formed in concentric circles with respect to a center of the disk-shaped substrate.

9. A magnetic disk according to claim 6, wherein the magnetic recording layer and the magnetically coupling layer are in contact with each other.

10. A magnetic disk according to claim 6, wherein the magnetically coupling layer contains at least CoCrPt.

11. A magnetic disk in which a magnetic recording layer with a granular structure in which nonmagnetic grain boundary portions are formed between magnetic grains continuously grown in a columnar shape and a magnetically coupling layer magnetically coupled to the magnetic grains in the magnetic recording layer are stacked in this order over a nonmagnetic disk-shaped substrate, the magnetic disk wherein:

at least the magnetically coupling layer out of the magnetically coupling layer and the magnetic recording layer comprises hard magnetic portions and soft magnetic portions alternately adjacent to each other in a radial direction of said substrate magnetic field, said soft magnetic portions being formed between but without being disposed over or under the plurality of hard magnetic portions.

12. A magnetic disk according to claim 11, wherein the hard magnetic portions in the magnetically coupling layer are formed at positions corresponding to recording regions, where magnetic signals are to be recorded, of the magnetic recording layer and the soft magnetic portions are formed in regions other than the positions.

13. A magnetic disk according to claim 11, wherein the soft magnetic portions and the hard magnetic portions are formed in concentric circles with respect to a center of the disk-shaped substrate.

14. A magnetic disk according to claim 11, wherein the magnetic recording layer and the magnetically coupling layer are in contact with each other.

15. A magnetic disk according to claim 11, wherein the magnetically coupling layer contains at least CoCrPt.

* * * * *